(12) United States Patent
Matsuyama et al.

(10) Patent No.: US 7,695,100 B2
(45) Date of Patent: Apr. 13, 2010

(54) IMAGE DEVICE

(75) Inventors: Kengo Matsuyama, Osaka (JP);
Masanori Yamada, Nara (JP); Haruo Sayama, Yamatokoriyama (JP);
Ryousuke Sugiyama, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1182 days.

(21) Appl. No.: 10/557,360

(22) PCT Filed: May 19, 2004

(86) PCT No.: PCT/JP2004/006739

§ 371 (c)(1),
(2), (4) Date: Nov. 17, 2005

(87) PCT Pub. No.: WO2004/103714

PCT Pub. Date: Dec. 2, 2004

(65) Prior Publication Data

US 2007/0081203 A1   Apr. 12, 2007

(30) Foreign Application Priority Data

May 21, 2003   (JP) .............................. 2003-144071

(51) Int. Cl.
*B41J 23/00* (2006.01)
*B41J 25/308* (2006.01)

(52) U.S. Cl. ................................ 347/37; 347/39; 347/8
(58) Field of Classification Search .................. 347/37, 347/8, 20, 5, 39
See application file for complete search history.

(56) References Cited

FOREIGN PATENT DOCUMENTS

| EP | 1 201 448 A2 | * | 5/2002 |
|---|---|---|---|
| JP | 2002-137481 A | | 5/2002 |
| JP | 2002-286035 A | | 10/2002 |

* cited by examiner

*Primary Examiner*—Shih-wen Hsieh
(74) *Attorney, Agent, or Firm*—Birch, Stewart, Kolasch & Birch LLP

(57) ABSTRACT

An image device includes a movable member, a guide shaft, and a shaft bearing. The movable member moves back and forth inside the device along a guide shaft when reading or recording image information. The guide shaft includes an arc portion in at least part of a cross-section. The shaft bearing is penetrated by the guide shaft at two locations in the movement direction that differ from the center of gravity in the movable member. The shaft bearing includes two inclined faces contacted by the arc portion of the guide shaft in the cross-section. The respective two inclined faces of the shaft bearing are at an angle θf (rad) and an angle θr (rad) with the perpendicular direction. The angle θf (rad) and the angle θr (rad) satisfy the following inequality:

$\cos\{\pi/2-(\theta f+\theta r)\}>0$.

8 Claims, 19 Drawing Sheets

FIG. 13
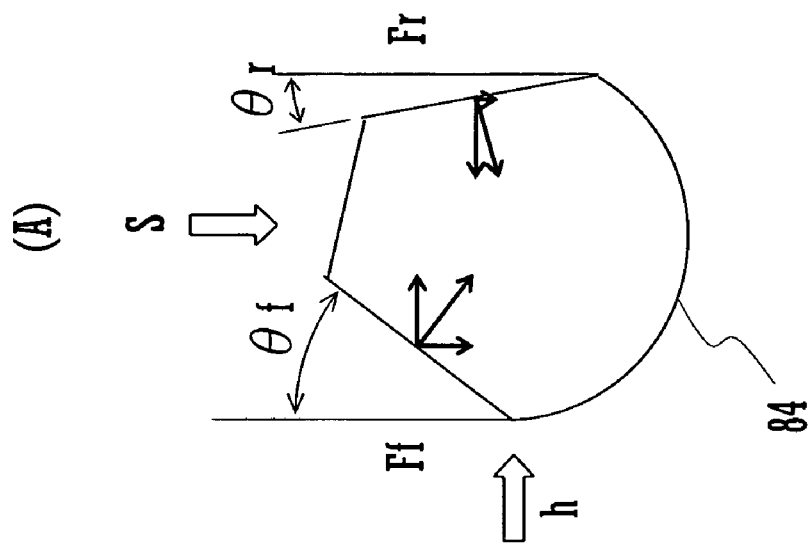
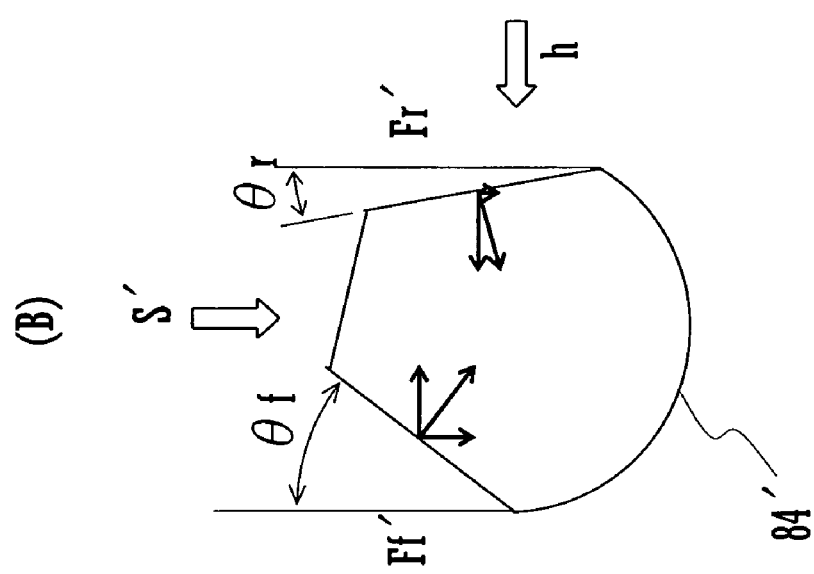

FIG. 15

| | | | | |
|---|---|---|---|---|
| ACCELERATION | G | G | 3 | 3 |
| WEIGHT | g | M | 90 | 90 |
| CENTER OF GRAVITY Y COORDINATE (TRANSPORT DIRECTION) | mm | y | 22.4 | 22.4 |
| CENTER OF GRAVITY Z COORDINATE (HEIGHT) | mm | j | 7.4 | 7.4 |
| BELT CLENCH HEIGHT | mm | z | 10 | 10 |
| CARRIAGE PRESSING SLIDER LOAD | g | P | 140 | 127 |
| CARRIAGE PRESSING SLIDER Y COORDINATE | mm | d | 0 | 0 |
| CARRIAGE PRESSING SLIDER Z COORDINATE | mm | a | 42.7 | 42.7 |
| CARRIAGE PRESSING SLIDER ANGLE | ° | $\eta$ | 30 | 30 |
| ROTATION STOPPER Z COORDINATE (HEIGHT) | mm | c | 46.9 | 46.9 |
| ROTATION STOPPER Y COORDINATE (TRANSPORT DIRECTION) | mm | k | 0 | 0 |
| INCLINED FACE ANGLE FRONT | ° | $\theta_f$ | 30 | 27 |
| INCLINED FACE ANGLE REAR | ° | $\theta_r$ | 25 | 24 |
| SANDWICH ANGLE | | $\theta_f + \theta_r$ | 55 | 51 |
| FRICTION COEFFICIENT (ROTATION STOPPER) | | $\mu$ | 0.2 | 0.2 |
| FRICTION COEFFICIENT (SLIDER) | | $\mu'$ | 0.2 | 0.2 |
| FRICTION COEFFICIENT (SHAFT) | | $\mu''$ | 0.2 | 0.2 |
| ROTATION STOPPER LOAD | g | W | 107 | 101 |
| INERTIAL EFFECT | g | $\alpha$ | -13 | -13 |
| ROTATION STOPPER FRICTION EFFECT | g | $\beta$ | 14 | 14 |
| PRESSING SLIDER FRICTION EFFECT | g | $\gamma$ | 34 | 30 |
| SLIDER SHAFT FRICTION EFFECT | g | $\delta$ | 26 | 26 |
| COEFFICIENT (M/2+Pcos $\eta$) | g | $\phi$ | 166 | 155 |
| COEFFICIENT ($\alpha + \beta + \gamma$) | g | $\varepsilon$ | 35 | 31 |
| YAWING MOMENT | g | h | 111 | 111 |
| SHAFT BEARING VERTICAL LOAD COMPONENT (ADVANCING SIDE) | g | S | 158 | 150 |
| SHAFT BEARING HORIZONTAL LOAD COMPONENT (ADVANCING SIDE) | g | h | 111 | 111 |
| SHAFT BEARING VERTICAL LOAD COMPONENT (FOLLOWING SIDE) | g | S' | 175 | 160 |
| SHAFT BEARING HORIZONTAL LOAD COMPONENT (FOLLOWING SIDE) | g | h' | 111 | 111 |
| ADVANCING SIDE FRONT LOAD | g | Ff | 117 | 119 |
| ADVANCING SIDE REAR LOAD | g | Fr | 234 | 237 |
| FOLLOWING SIDE FRONT LOAD | g | Ff' | 251 | 246 |
| FOLLOWING SIDE REAR LOAD | g | Fr' | 117 | 119 |
| SLIDING RESISTANCE | g | R | 221 | 215 |
| OPPOSITE INCLINED FACE PARALLEL DIRECTION MOMENT (ADVANCING SIDE) | g·mm | Tf | 2614 | 2511 |
| OPPOSITE INCLINED FACE PARALLEL DIRECTION MOMENT (FOLLOWING SIDE) | g·mm | Tr' | 2621 | 2510 |
| LOAD BALANCE | | Ff / Fr' | 1.00 | 1.00 |

FIG. 18
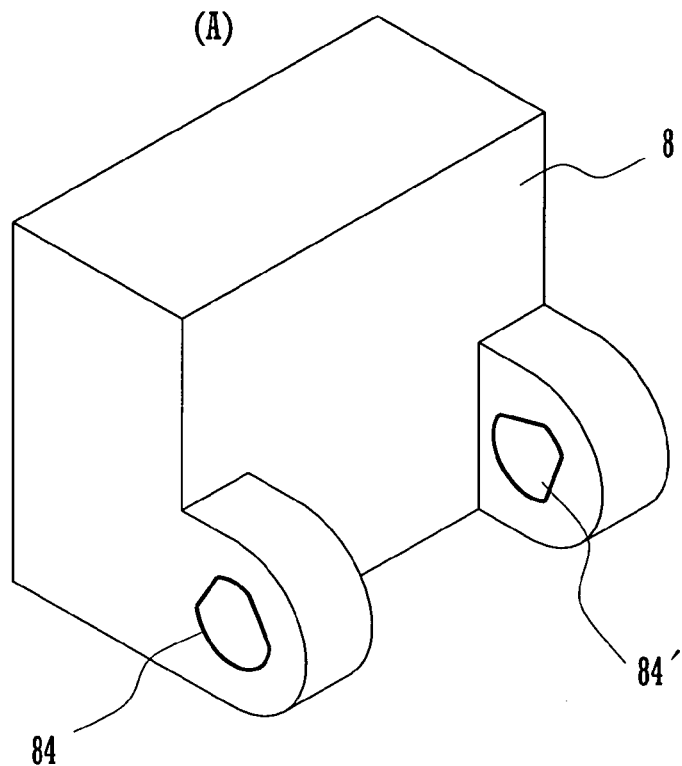
(A)
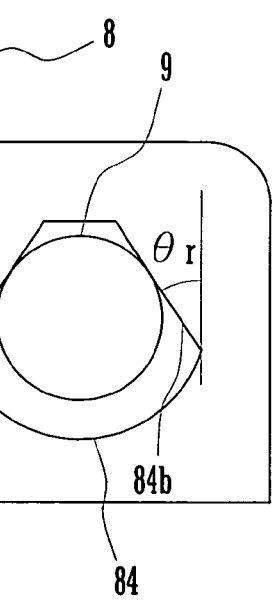
(B)
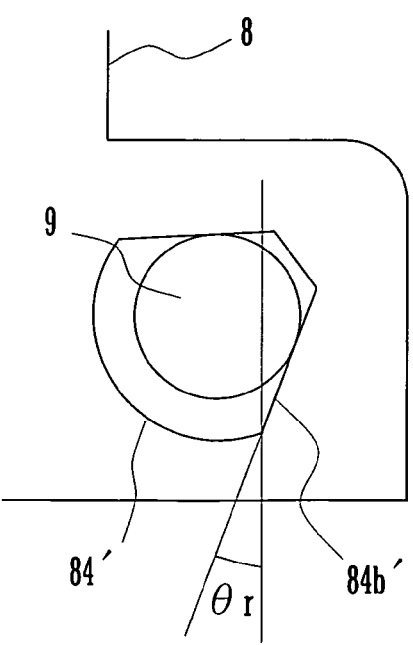
(C)

FIG. 19

| | | | | |
|---|---|---|---|---|
| ACCELERATION | G | G | 2 | 0.8 |
| CARRIAGE WIDTH | mm | b | 72.3 | 72.3 |
| WEIGHT | g | M | 285 | 285 |
| CENTER OF GRAVITY Y COORDINATE (TRANSPORT DIRECTION) | mm | v | 38.9 | 38.9 |
| CENTER OF GRAVITY Z COORDINATE (HEIGHT) | mm | j | 27.4 | 27.4 |
| BELT CLENCH HEIGHT | mm | z | 10.9 | 10.9 |
| DIFFERENCE OF BELT WITH CENTER OF GRAVITY | mm | ej-z | 16.5 | 16.5 |
| CARRIAGE PRESSING SLIDER LOAD | g | P | 0 | 0 |
| CARRIAGE PRESSING SLIDER Y COORDINATE | mm | d | 0 | 0 |
| CARRIAGE PRESSING SLIDER Z COORDINATE | mm | a | 0 | 0 |
| CARRIAGE PRESSING SLIDER ANGLE | ° | $\eta$ | 0 | 0 |
| ROTATION STOPPER Z COORDINATE (HEIGHT) | mm | c | 64 | 64 |
| ROTATION STOPPER Y COORDINATE (TRANSPORT DIRECTION) | mm | k | 0 | 0 |
| INCLINED FACE ANGLE FRONT | ° | $\theta f$ | 29 | 41 |
| INCLINED FACE ANGLE REAR | ° | $\theta r$ | -8 | 7 |
| SANDWICH ANGLE | | $\theta f + \theta r$ | 21 | 48 |
| FRICTION COEFFICIENT (ROTATION STOPPER) | | $\mu$ | 0.2 | 0.2 |
| FRICTION COEFFICIENT (SLIDER) | | $\mu'$ | 0 | 0 |
| FRICTION COEFFICIENT (SHAFT) | | $\mu''$ | 0.2 | 0.2 |
| ROTATION STOPPER LOAD | g | W | 173 | 173 |
| INERTIAL EFFECT | g | $\alpha$ | 130 | 52 |
| ROTATION STOPPER FRICTION EFFECT | g | $\beta$ | 25 | 25 |
| PRESSING SLIDER FRICTION EFFECT | g | $\gamma$ | 0 | 0 |
| SLIDER SHAFT FRICTION EFFECT | g | $\delta$ | 45 | 20 |
| COEFFICIENT ($M/2 + P\cos\eta$) | g | $\phi$ | 143 | 143 |
| COEFFICIENT ($\alpha + \beta + \gamma$) | g | $\varepsilon$ | 156 | 77 |
| YAWING MOMENT | g | h | | |
| SHAFT BEARING VERTICAL LOAD COMPONENT (ADVANCING SIDE) | g | S | 32 | 85 |
| SHAFT BEARING HORIZONTAL LOAD COMPONENT (ADVANCING SIDE) | g | h | 307 | 123 |
| SHAFT BEARING VERTICAL LOAD COMPONENT (FOLLOWING SIDE) | g | S' | 253 | 200 |
| SHAFT BEARING HORIZONTAL LOAD COMPONENT (FOLLOWING SIDE) | g | h | 307 | 123 |
| ADVANCING SIDE FRONT LOAD | g | Ff | 207 | 94 |
| ADVANCING SIDE REAR LOAD | g | Fr | 492 | 195 |
| FOLLOWING SIDE FRONT LOAD | g | Ff' | 581 | 287 |
| FOLLOWING SIDE REAR LOAD | g | Fr' | 204 | 95 |
| SLIDING RESISTANCE | g | R | 331 | 169 |
| OPPOSITE INCLINED FACE PARALLEL DIRECTION MOMENT (ADVANCING SIDE) | g·mm | Tf | 2683 | 2520 |
| OPPOSITE INCLINED FACE PARALLEL DIRECTION MOMENT (FOLLOWING SIDE) | g·mm | Tr' | 2642 | 2545 |
| LOAD BALANCE | | Ff / Fr' | 1.02 | 0.99 |

IMAGE DEVICE

TECHNICAL FIELD

The present invention relates to an image device such as: an image recording device that moves a recording portion facing an image forming face of a recording medium back and forth along a guide shaft; or an image reading device that moves a reading portion facing an image face of a document back and forth along a guide shaft.

BACKGROUND ART

Among image devices including image recording devices such as printers and image reading devices such as scanners, there are image devices in which a movable body is moved back and forth within a predetermined range in the apparatus. For example, in inkjet printers, which are image recording devices, an ink head and ink cartridge, which are recording portions, are loaded on a carriage, which is a movable body, and that carriage is moved back and forth in a direction perpendicular to the transport direction of a recording medium such as paper. The carriage moves back and forth in a range that the ink head faces the entire image forming face of the recording medium in the direction perpendicular to the transport direction.

Thus, in the internal portion of the inkjet printer, a guide shaft is fixed whose longitudinal direction has been matched with the direction perpendicular to the transport direction of the recording medium. This guide shaft passes through a shaft bearing provided in the carriage. The movement direction of the carriage is prescribed to be the longitudinal direction of the guide shaft.

Ordinarily, in the carriage, the shaft bearing that the guide shaft penetrates is disposed in a position biased upstream or downstream in the transport direction of the recording medium from the center of gravity of the carriage, such that the guide shaft does not interfere with the ink cartridge or ink head loaded on the center portion of the carriage. Thus, a rotational moment centered on the guide shaft acts on the carriage. Also, forces that raise one end of the carriage in the direction of movement due to inertial force when accelerating or decelerating, and that rotate the carriage in a horizontal plane including the guide shaft, act on the carriage, which moves along the guide shaft. When the carriage is displaced in a direction other than the direction of movement along the guide shaft due to the action of these forces, the interval between the ink head and the image forming face of the recording medium changes, not only generating noise and vibration when the carriage moves, but also leading to a decrease in image quality because the image forming state is not fixedly maintained.

Consequently, in an ink jet printer, the carriage is fixed with respect to a direction of rotation centered on the guide shaft in order that rolling due to rotational moment in the carriage, and pitching and yawing due to inertial force when accelerating or decelerating, will not occur.

As an example of a configuration for this purpose, there are ink jet printers in which two guide rails are disposed parallel to the guide shaft, and a pressing member and a rotation stopping member that slide on each guide rail are provided in the carriage. Due to the pressing member pressing against one of the guide rails with a predetermined pressing force, rotational force in one direction that is centered on the guide shaft acts on the carriage. Due to the rotation stopping member contacting the other guide rail in the direction of this rotational force, the position of the carriage is fixed with respect to the direction of rotation centered on the guide shaft.

In this way, it is assumed that the guide shaft does not dislocate at the shaft bearing in a direction perpendicular to the direction of movement of the carriage, in order to reliably prevent carriage rotation centered around the guide shaft by putting the rotation stopping member and the pressing member in contact with the two guide rails.

On the other hand, ink jet printers have been proposed in which, in order to make it unnecessary to strictly maintain machining accuracy with the guide shaft, as the shaft bearing provided in the carriage, at least two inclined faces that contact an arc portion that constitutes a cross-section of the guide shaft are provided that contact the guide shaft at only two points in the cross-section (for example, see Patent Document 1).

In the configuration disclosed in Patent Document 1, by setting angles formed by a tangential direction and a perpendicular direction on the outer circumferential face of the guide shaft at the two contact points between the shaft bearing and the guide shaft such that frictional force generated between the guide shaft and the shaft bearing becomes larger than the force that attempts to slide the bearing shaft along the circumferential direction of the guide shaft during acceleration or deceleration of the carriage, the carriage is driven in a state in which a predetermined precision is maintained relative to the guide shaft.

Thus, in the configuration disclosed in Patent Document 1, along with controlling rotation of the carriage around the guide shaft, a guide rail is further provided that guides the carriage such that it is driven back and forth in the direction of the intersecting direction, and the angles are set according to the weight of the carriage, the position of the center of gravity of the carriage relative to the guide shaft, the distance between shaft bearings respectively provided in approximately both end portions of the carriage, the coefficient of friction between the shaft bearing and the guide shaft, the position of a guide transmission portion of the carriage relative to the guide shaft, the position of the guide rail relative to the guide shaft, and the speed of acceleration or deceleration conferred on the carriage. Thus, the shaft bearing portion of the carriage is prevented from rising up from the guide shaft during acceleration or deceleration of the carriage, noise and vibration is suppressed when the carriage is accelerated or decelerated, and it is made possible to record an image quietly and with high precision.

It is also described that of the angles mentioned above, by adopting a configuration in which the angle formed by a tangential direction and a perpendicular direction on the outer circumferential face of the guide shaft at the contact point of the downstream side of the transport direction of the recording medium is smaller than the angle formed by a tangential direction and a perpendicular direction on the outer circumferential face of the guide shaft at the contact point of the upstream side of the transport direction, because the sliding load between the guide shaft and the shaft bearing diminishes, the amount of friction at the contact point of the shaft bearing can be suppressed to a minimum limit, and it becomes possible to improve the durability of the recording device.

However, according to the configuration disclosed in the aforementioned Patent Document 1, there is the problem that it is not possible to reliably control rolling, pitching, and yawing that is generated during acceleration and deceleration of the carriage that moves along the guide shaft. That is, with only the factors considered in the configuration disclosed in Patent Document 1, it is not possible to reliable determine the angle of the two inclined faces of the shaft bearing. Thus, vibration and noise are generated when the carriage moves, leading to a deterioration of the image forming state. This sort of problem occurs not only in image recording devices such as ink jet printers provided with a carriage that is loaded with an ink head and an ink cartridge and moves back and forth; it likewise also occurs in image reading devices such as scanners provided with a unit that is loaded with a lens and a light-receiving element and moves back and forth.

It is an object of the present invention to provide an image apparatus in which, by considering all of the factors that operate on a movable member that moves along a guide shaft, it is possible to reliably control rolling, pitching, and yawing generated when accelerating or decelerating the movable member. Patent Document 1: JP 2002-137481A

DISCLOSURE OF THE INVENTION

This invention is provided with the following configurations as a means for solving the problems described above.

(1) An image device includes a movable member, a guide shaft, and a shaft bearing. The movable member moves back and forth inside the device along a guide shaft when reading or recording image information. The guide shaft includes an arc portion in at least part of a cross-section. The shaft bearing is penetrated by the guide shaft at two locations in the movement direction that differ from the center of gravity in the movable member. The shaft bearing includes two inclined faces contacted by the arc portion of the guide shaft in the cross-section. The respective two inclined faces of the shaft bearing are at an angle $\theta f$ (rad) and an angle $\theta r$ (rad) with the perpendicular direction. The angle $\theta f$ (rad) and the angle $\theta r$ (rad) satisfy the following inequality:

$$\cos\{\pi/2-(\theta f+\theta r)\}>0.$$

As shown in FIG. 14, with respect to a load F that acts on the guide shaft from one of the two inclined faces of the shaft bearing, for which the angles formed with the perpendicular direction are $\theta f$ and $\theta r$, a component E parallel to the other inclined face is $$E=F\cdot\cos\{\pi/2-(\theta f+\theta r)\}.$$

When the direction against which the guide shaft is pressed is made positive, when this parallel component E is a positive value, it becomes the direction that the guide shaft bites into the inclined face of the shaft bearing, and rising up of the movable member from the guide shaft does not occur. On the other hand, when the parallel component E is a negative value, it becomes the direction that the guide shaft separates from the inclined face of the shaft bearing, rising up of the movable member from the guide shaft occurs, and it becomes impossible to insure positional accuracy.

In this configuration, the cosine of an angle obtained by subtracting the sum of the angles which the two respective inclined faces of the shaft bearings provided at two locations of the movable member form with the perpendicular direction from $\pi/2$ is made to be a positive value. Accordingly, when the direction that presses against the guide shaft has been made a positive value, because a load F that acts on the guide shaft from one of the inclined faces definitely becomes a positive value, the component E parallel to the other inclined face obtained by multiplying a positive cosine value by this value also definitely becomes a positive value, and this component becomes the direction that the guide shaft bites into the inclined faces of the shaft bearing. Thus, it is possible to reliably prevent the movable member from rising up from the guide shaft.

(2) The image device further includes first and second guide rails disposed parallel to the guide shaft, a rotation stopping member that slides in the direction of rotation of the movable member with the guide shaft as a center and in contact with the first guide rail, and a pressing member that slides pressing against the second guide rail are provided in the movable member.

The angle $\theta f$ (rad) and the angle $\theta r$ (rad) are determined such that the load Ff (gf) received by the inclined face of the side of the center of gravity of the movable member in the shaft bearing on the downstream side in the movement direction and the load Fr' (gf) received by the inclined face opposite to the side of the center of gravity of the movable member in the shaft bearing on the upstream side in the movement direction become positive values when calculated when the mass of the movable member is made M, the acceleration that acts on the first guide rail from the movable member when accelerating is made G, the load that acts on the rotation stopping member is made W, the coefficient of friction between the rotation stopping member and the first guide rail is made $\mu$, the pressing force that acts on the second guide rail from the pressing member is made P, the coefficient of friction between the rotation stopping member and the second guide rail is made $\mu'$, the coefficient of friction between the shaft bearings and the guide shaft is made $\mu''$, an angle formed with the direction perpendicular to the pressing force that acts on the second guide rail from the pressing member is made $\eta$, in the perpendicular direction, the distance from the contact position of the guide shaft and the shaft bearings to the point where movement force acts in the movable member is made z, the distance to the contact position of the first guide rail and the rotation stopper is made c, the distance to the center of gravity of the movable member is made j, the distance to the contact position of the second guide rail and the pressing member is made a, in the horizontal direction perpendicular to the movement direction of the movable member, the distance from the contact position of the guide shaft and the shaft bearing to the center of gravity of the movable member is made y, the distance to the contact position of the first guide rail and the rotation stopper is made d, the distance to the contact position of the second guide rail and the pressing member is made k, in the movement direction of the movable body, the spacing of the two shaft bearings is made b, and $$Ff=\{\phi-\epsilon-h\cdot\tan\theta r\}\cdot\cos\theta r/\sin(\theta f+\theta r)+2\phi\{(\mu''\cdot z)/b\}$$
$$(\cos\theta r+\cos\theta f)\cdot\cos\theta r/\sin 2(\theta f+\theta r)\ Fr'=\{\phi+\epsilon-h\cdot\tan\theta f\}\cdot\cos\theta f/\sin(\theta f+\theta r)-2\phi\{(\mu''\cdot z)/b\}(\cos\theta r+\cos\theta f)\cdot\cos\theta f/\sin 2(\theta f+\theta r),$$

Where $+=(M/2)+P\cdot\cos\eta$ $$\epsilon=\{G\cdot M(j-z)+\mu\cdot W(c-z)+2\mu'\cdot P(a-z)\}/b$$

$$h=\{G\cdot M\cdot y+2\mu''\cdot P\cdot d+\mu\cdot W\cdot k\}/b.$$

In this configuration, the angles which the two inclined faces of the shaft bearing form with the perpendicular direction are determined taking into consideration all of the factors that affect the load that acts on the guide shaft from the inclined face of the side of the center of gravity of the movable member in the shaft bearing on the downstream side in the movement direction, and the load that acts on the guide shaft from the inclined face opposite to the side of the center of gravity of the movable member in the shaft bearing on the upstream side in the movement direction, when the movable member accelerates. Accordingly, the inclined faces of the shaft bearing do not separate from the guide shaft when the movable member accelerates due to the load that acts on the guide shaft from the inclined faces of the shaft bearing, and there is no occurrence of the movable member rising up.

(3) The image device further includes first and second guide rails disposed parallel to the guide shaft, a rotation stopping member that slides in the direction of rotation of the movable member with the guide shaft as a center and in contact with the first guide rail, and a pressing member that slides pressing against the second guide rail, are provided in the movable member.

The angle $\theta f$ (rad) and the angle $\theta r$ (rad) are determined such that the load Ff' (gf) received by the inclined face opposite to the side of the center of gravity of the movable member in the shaft bearing on the down stream side in the movement direction and the load Fr (gf) received by the inclined face opposite to the side of the center of gravity of the movable member in the shaft bearing on the upstream side in the movement direction become positive values when calculated when the mass of the movable member is made M, the acceleration that acts on the movable member when accelerating is made G, the load that acts on the first guide rail from the rotation stopping member is made W, the coefficient of friction between the rotation stopping member and the first guide rail is made $\mu$, the pressing force that acts on the second guide rail from the pressing member is made P, the coefficient of friction between the rotation stopping member and the second guide rail is made $\mu'$, the coefficient of friction between the shaft bearings and the guide shaft is made $\mu''$, an angle formed with the direction perpendicular to the pressing force that acts on the second guide rail from the pressing member is made $\eta$, in the perpendicular direction, the distance from the contact position of the guide shaft and the shaft bearings to the point where movement force acts in the movable member is made z, the distance to the contact position of the first guide rail and the rotation stopper is made c, the distance to the center of gravity of the movable member is made j, the distance to the contact position of the second guide rail and the pressing member is made a, in the horizontal direction perpendicular to the movement direction of the movable member, the distance from the contact position of the guide shaft and the shaft bearing to the center of gravity of the movable member is made y, the distance to the contact position of the first guide rail and the rotation stopper is made d, the distance to the contact position of the second guide rail and the pressing member is made k, in the movement direction of the movable body, the spacing of the two shaft bearings is made b, and $Ff'=\{\phi+\epsilon+h\cdot\tan\theta r\}\cdot\cos\theta r/\sin(\theta f+\theta r)-2\phi\{(\mu''\cdot z)/b\}$
$(\cos\theta r+\cos\theta f)\cdot\cos\theta r/\sin 2(\theta f+\theta r)$ $Fr'=\{\phi-\epsilon+h\cdot\tan\theta r\}\cdot\cos\theta r/\sin(\theta f+\theta r)+2\phi\{(\mu''\cdot z)/b\}(\cos\theta r+\cos\theta f)\cdot\cos\theta r/\sin 2(\theta f+\theta r)$, Where $\phi=(M/2)+P\cdot\cos\eta$ $\epsilon=\{G\cdot M(j-z)+\mu\cdot W(c-z)+2\mu'\cdot P(a-z)\}/b$ $h=\{G\cdot M\cdot y+2\mu''\cdot P\cdot d+\mu\cdot W\cdot k\}/b$.

In this configuration, the angles which the two inclined faces of the shaft bearing form with the perpendicular direction are determined taking into consideration all of the factors that affect the load that acts on the guide shaft from the inclined face opposite to the side of the center of gravity of the movable member in the shaft bearing on the downstream side in the movement direction, and the load that acts on the guide shaft from the inclined face of the side of the center of gravity of the movable member in the shaft bearing on the upstream side in the movement direction, when the movable member decelerates. Thus, the inclined faces of the shaft bearing do not separate from the guide shaft when the movable member decelerates due to the load that acts on the guide shaft from the inclined faces of the shaft bearing, and there is no occurrence of the movable member rising up.

(4) The maximum value of the moment that acts on the movable member when it moves due to disturbance is made Mm (gf), and the load Ff (gf) received by the inclined face of the side of the center of gravity of the movable member in the shaft bearing on the downstream side in the movement direction and the load Fr' (gf) received by the inclined face opposite to the side of the center of gravity of the movable member in the shaft bearing on the upstream side in the movement direction are made $Ff\cdot\cos\{\pi/2-(\theta f+\theta r)\}\cdot b/2 > Mm$ $Fr'\cdot\cos\{\pi/2-(\theta f+\theta r)\}\cdot b/2 > Mm$ In this configuration, the angles which the two inclined faces of the shaft bearing form with the perpendicular direction are determined taking into consideration all of the factors that affect the load that acts on the guide shaft from the inclined face of the side of the center of gravity of the movable member in the shaft bearing on the downstream side in the movement direction, and the load that acts on the guide shaft from the inclined face opposite to the side of the center of gravity of the movable member in the shaft bearing on the upstream side in the movement direction, when the movable member accelerates. Thus, the inclined faces of the shaft bearing do not separate from the guide shaft when the movable member accelerates due to the load that acts on the guide shaft from the inclined faces of the shaft bearing, and there is no occurrence of the movable member rising up.

(5) The maximum value of the moment that acts on the movable member when it moves due to disturbance is made Mm (gf·mm), and the load Ff' (gf) received by the inclined face opposite to the side of the center of gravity of the movable member in the shaft bearing on the downstream side in the movement direction and the load Fr (gf) received by the inclined face of the center of gravity of the movable member in the shaft bearing on the upstream side in the movement direction are made $Ff'\cdot\cos\{\pi/2-(\theta f+\theta r)\}\cdot b/2 > Mm$ $Fr\cdot\cos\{\pi/2-(\theta f+\theta r)\}\cdot b/2 > Mm$ In this configuration, the angles which the two inclined faces of the shaft bearing form with the perpendicular direction are determined taking into consideration all of the factors that affect the load that acts on the guide shaft from the inclined face opposite to the center of gravity of the movable member in the shaft bearing on the downstream side in the movement direction, and the load that acts on the guide shaft from the inclined face of the side of the center of gravity of the movable member in the shaft bearing on the upstream side in the movement direction, when the movable member decelerates. Thus, the inclined faces of the shaft bearing do not separate from the guide shaft when the movable member decelerates due to the load that acts on the guide shaft from the inclined faces of the shaft bearing, and there is no occurrence of the movable member rising up.

(6) The load Ff (gf) received by the inclined face of the side of the center of gravity of the movable member in the shaft bearing on the downstream side in the movement direction and the load Fr' (gf) received by the inclined face opposite to the side of the center of gravity of the movable member in the shaft bearing on the upstream side in the movement direction are made approximately equal.

In this configuration, the angles which the inclined faces of the shaft bearings form with the perpendicular direction are set such that the load that acts on the inclined face of the side of the center of gravity of the movable member in the shaft bearing on the downstream side in the movement direction and the load that acts on the inclined face opposite to the center of gravity of the movable member in the shaft bearing on the upstream side in the movement direction are made approximately equal when the movable member accelerates. Thus, an approximately equal moment is generated at the inclined faces of each shaft bearing when the movable member accelerates, and the movement of the movable member is stable.

(7) The load Ff' (gf) received by the inclined face opposite to the side of the center of gravity of the movable member in the shaft bearing on the downstream side in the movement direction and the load Fr (gf) received by the inclined face of the center of gravity of the movable member in the shaft bearing on the upstream side in the movement direction are made approximately equal.

In this configuration, the angles which the inclined faces of the shaft bearings form with the perpendicular direction are set such that the load that acts on the guide shaft from the inclined face opposite to the side of the center of gravity of the movable member in the shaft bearing on the downstream side in the movement direction and the load that acts on the guide shaft from the inclined face of the center of gravity of the movable member in the shaft bearing on the upstream side in the movement direction are made approximately equal when the movable member decelerates. Thus, an approximately equal moment is generated at the inclined faces of each shaft bearing when the movable member decelerates, and the movement of the movable member is stable.

(8) The angle $\theta f$ (rad) and the angle $\theta r$ (rad) which the two respective inclined faces of the shaft bearing form with the perpendicular direction are determined such that they satisfy $$abs[\Delta(\mu \cdot W + 2 \cdot \mu' \cdot P + \mu'' \cdot T)/\Delta\{57.3 \cdot (\theta f + \theta r)\}] \leqq 2.$$

There is a relationship between the sum of the angles which the two inclined faces in the shaft bearing form with the perpendicular direction and the sliding resistance between the inclined faces and the guide shaft, as shown in FIG. 11, and the value of sliding resistance becomes an approximately minimum value in a range where the ratio of the change in sliding resistance to the sum of the angles is not more than two.

In this configuration, the angles of the inclined faces are determined such that the ratio of the change in sliding resistance to the sum of the angles is not more than two. Thus, the sliding resistance that occurs between the shaft bearings and the guide shaft when the movable member moves can be suppressed to a low value, and the movable member moves smoothly.

(9) In the shaft bearings disposed in two locations in the movement direction of the movable member, the angle $\theta f$ (rad) and the angle $\theta r$ (rad) which the two respective inclined faces of the shaft bearing form with the perpendicular direction differ from each other.

In this configuration, shaft bearings for which the inclination angles of the inclined faces differ are disposed at two locations in the movement direction of the movable member. Thus, the movable member moves back and forth in a stable state even when the movement speed of the movable member differs when moving forth and when moving back.

BRIEF DESCRIPTION OF THE DRAWINGS

FIG. 13 is a side view of a shaft bearing that illustrates the same calculation method.

FIG. 15 shows data values of an embodiment of this invention.

FIG. 18 is a view of the configuration of a carriage applied in an inkjet printer according to another embodiment of this invention.

FIG. 19 shows data values of another embodiment of this invention.

DESCRIPTION OF THE INVENTION

Figure 1:
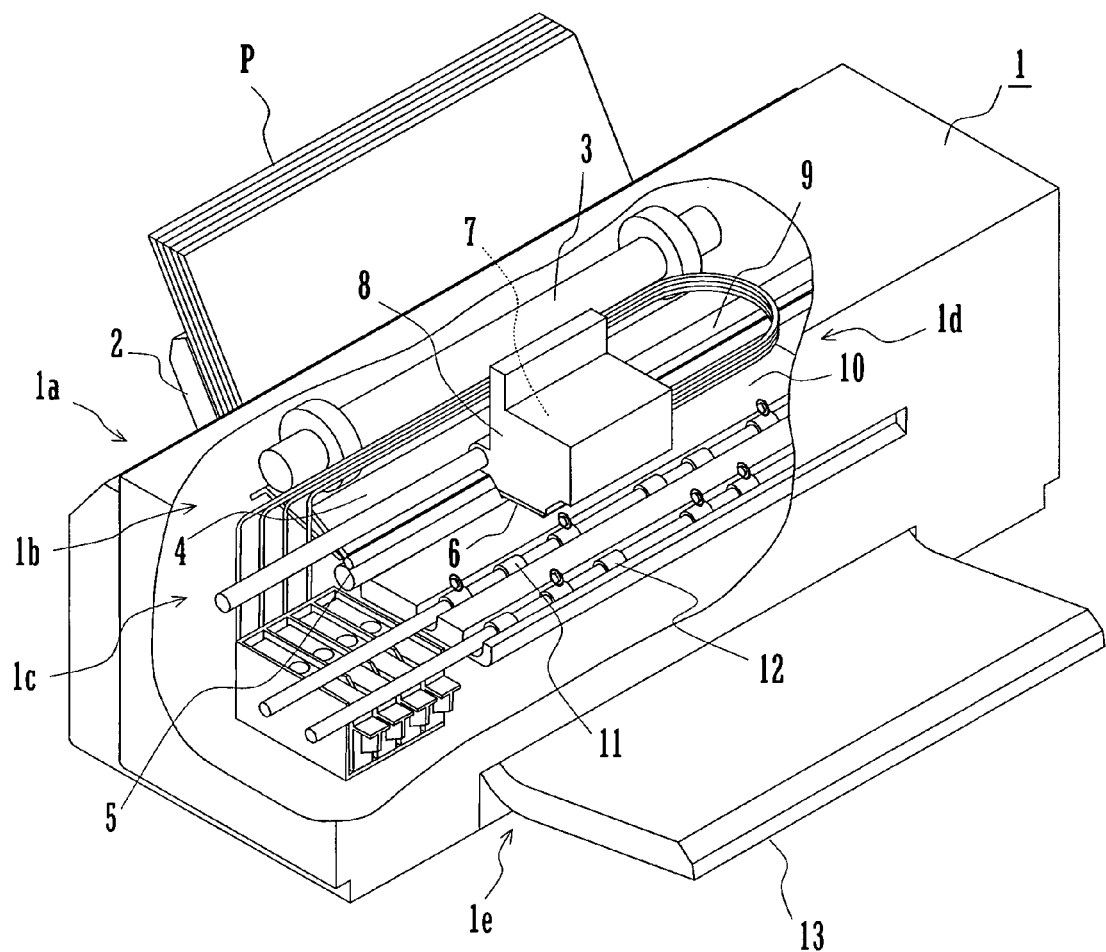
FIG. 1 is an exterior view of an ink jet printer that is an image device according to an embodiment of this invention.

FIG. 1 is an exterior view of an ink jet printer that is an image device according to an embodiment of this invention. An inkjet printer 1 is configured from a paper supply portion 1a, a separation portion 1b, a transport portion 1c, a printing portion 1d, and a discharge portion 1e. The paper supply portion 1a supplies paper P that is a recording medium when performing printing, and includes a paper supply tray 2 and a pickup roller 3. The paper supply portion 1a stores the paper P when printing is not performed.

The separation portion 1b supplies the paper P supplied from the paper supply portion 1a to the transport portion 1c page by page, and is constituted of a paper supply roller and a separation device that are not shown in the figures. The frictional force between a pad portion of the separation device (the portion that touches the paper P) and the paper P is greater than the frictional force between pages of the paper P. Also, the frictional force between the paper supply roller and the paper P is greater than the frictional force between the pad portion of the separation device and the paper P, and greater than the frictional force between pages of the paper P. Thus, even if a plurality of pages of the paper P are fed from the paper supply portion 1a to the separation portion 1b at the same time, these pages of paper P are separated by the paper supply roller and the separation device, and only the topmost page of paper P is guided to the transport portion 1c.

The transport portion 1c is provided with a guide plate 4 and a transport roller 5, and transports the paper P transported page by page from the separation portion 1b to the printing portion 1d. The transport roller 5 adjusts the transport speed and the transport start timing of the paper P when the paper P is fed between an ink head 6 and a platen 10, such that ink discharged from the ink head 6 affixes to an appropriate position of the paper P.

The printing portion 1d prints an image to an image forming face of the paper P transported by the transport roller 5 of the transport portion 1c, and includes the ink head 6 that discharges ink according to the image, an ink cartridge 7 storing ink to be supplied to the ink head, a carriage 8 on which the ink head 6 and the ink cartridge 7 are loaded and that moves back and forth, a guide shaft 9 that guides the movement direction of the carriage 8, and a platen 10 that holds the paper P when printing.

The discharge portion 1e discharges paper P for which printing has been performed on an image forming face out of the ink jet printer 1, and includes discharge rollers 11 and 12, and a discharge tray 13. Paper P that has passed the printing portion 1d is discharged onto the discharge tray 13 by the discharge rollers 11 and 12.

In this configuration, the inkjet printer 1 performs printing according to the following operation. First, based on image information, a printing request is made to the ink jet printer 1 from a computer or the like not shown in the figures. The inkjet printer 1, having received the request, dispatches the paper P on the paper supply tray 2 with the pickup roller 3. Next, the dispatched paper P passes the separation portion 1b and is fed to the transport portion 1c page by page by the paper supply roller, and is further transported between the ink head 6 and the platen 10 of the printing portion id by the transport roller 5 of the transport portion 1c.

In the printing portion 1d, ink is discharged from the ink head 6 to an image forming face of the paper P on the platen 10 corresponding to the image information. At this time the paper P is temporarily stopped on the platen 10. As ink is discharged, the carriage 8 moves the amount of one line in a main scanning direction perpendicular to the paper transport direction along the guide shaft 9. When the carriage 8 reaches one end of the movement range, the paper P is transported only a fixed width on the platen 10 in a secondary scanning direction, which is the paper transport direction. In the printing portion 1d, an image is printed on the entire face of the paper P by repeatedly executing transport stoppage of the paper P, movement of the carriage 8 that accompanies driving of the ink head 6, and transport of the paper P, corresponding to the image information. The paper P on which an image has been printed is discharged onto the discharge tray 13 by the discharge rollers 11 and 12.

Figure 2:
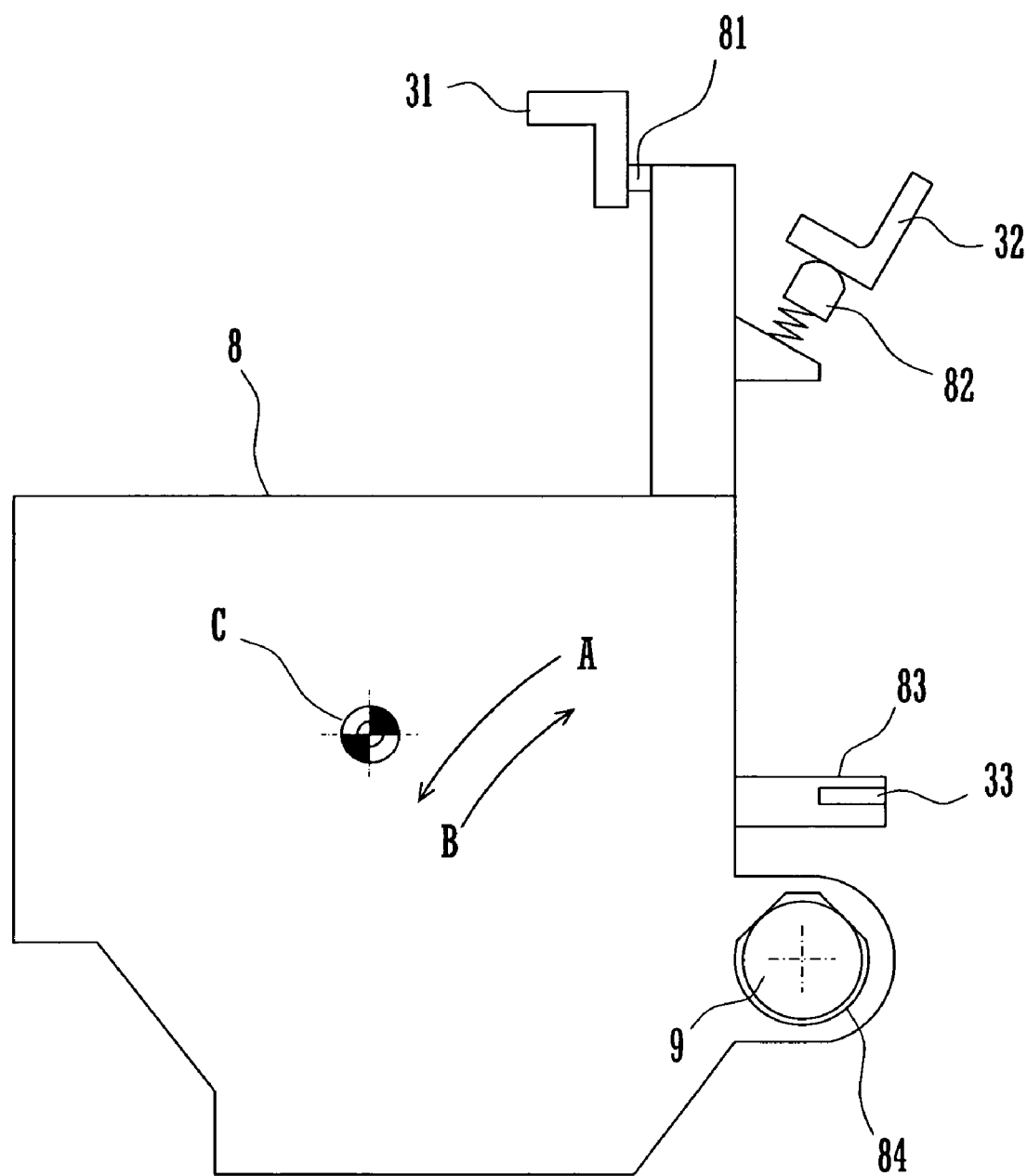
FIG. 2 is a side view of relevant portions including a carriage in the aforementioned inkjet printer.
Figure 3:
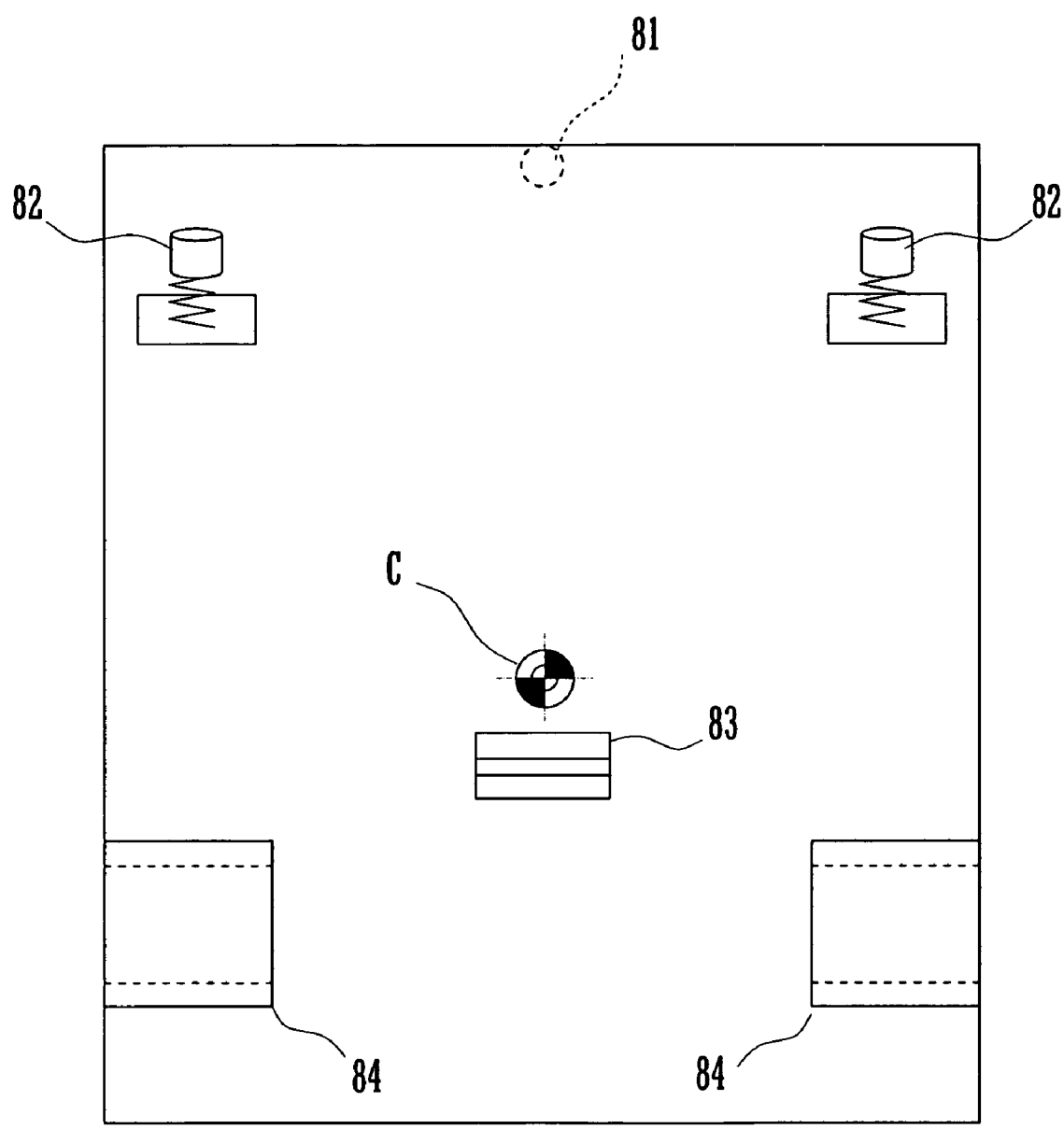
FIG. 3 is a rear view of relevant portion including a carriage in the aforementioned inkjet printer.

FIGS. 2 and 3 are a side view and a rear view of relevant portions including the carriage in the above inkjet printer. The carriage 8 includes a rotation stopping member 81, a pressing member 82, a belt receiver 83 and a shaft bearing 84. The rotation stopping member 81 abuts a first guide rail 31. The pressing member 82 presses against a second guide rail 32. The guide rails 31 and 32 are disposed parallel to the guide shaft 9 in the interior portion of the inkjet printer 1. Part of a driving belt 33 is fixed to the belt receiver 83. The guide shaft 9 penetrates the shaft bearing 84.

The driving belt 33 fixed to the belt receiver 83 is stretched between a driving pulley and a driven pulley that are not shown in the figures. The driving pulley is fixed to a rotating shaft of a driving motor that is not shown in the figures. Accordingly, rotation of the driving motor is transmitted to the carriage 8 via the driving belt 33, and the carriage 8 moves back and forth along the guide shaft 9.

The shaft bearing 84 that the guide shaft 9 penetrates is disposed in the lower portion of the rear side of the carriage 8, and is positioned lower in the rear side than a center of gravity C of the carriage 8. Accordingly, the carriage 8 attempts to rotate in the direction of arrow A, with the guide shaft 9 as the center of rotation. In order to control this rotation, the rotation stopping member 81 provided in the upper portion of the carriage 8 abuts the first guide rail 31 toward the front side. Also, the carriage 8 can be thought to rotate in the direction of arrow B when vibration or shock have acted on the inkjet printer 1. In order to control this rotation, the pressing member 82 provided in the upper portion of the carriage 8 presses against the second guide rail 32 in the diagonally upward direction of the rear side.

As is clear in the rear view in FIG. 3, the rotation stopping member 81 and the belt receiver 83 are provided in one location in of the center portion in the movement direction of the carriage 8, and the pressing member 82 and the shaft bearing 84 are provided in two locations in the vicinity of both ends of the movement direction of the carriage 8.

Figure 4:
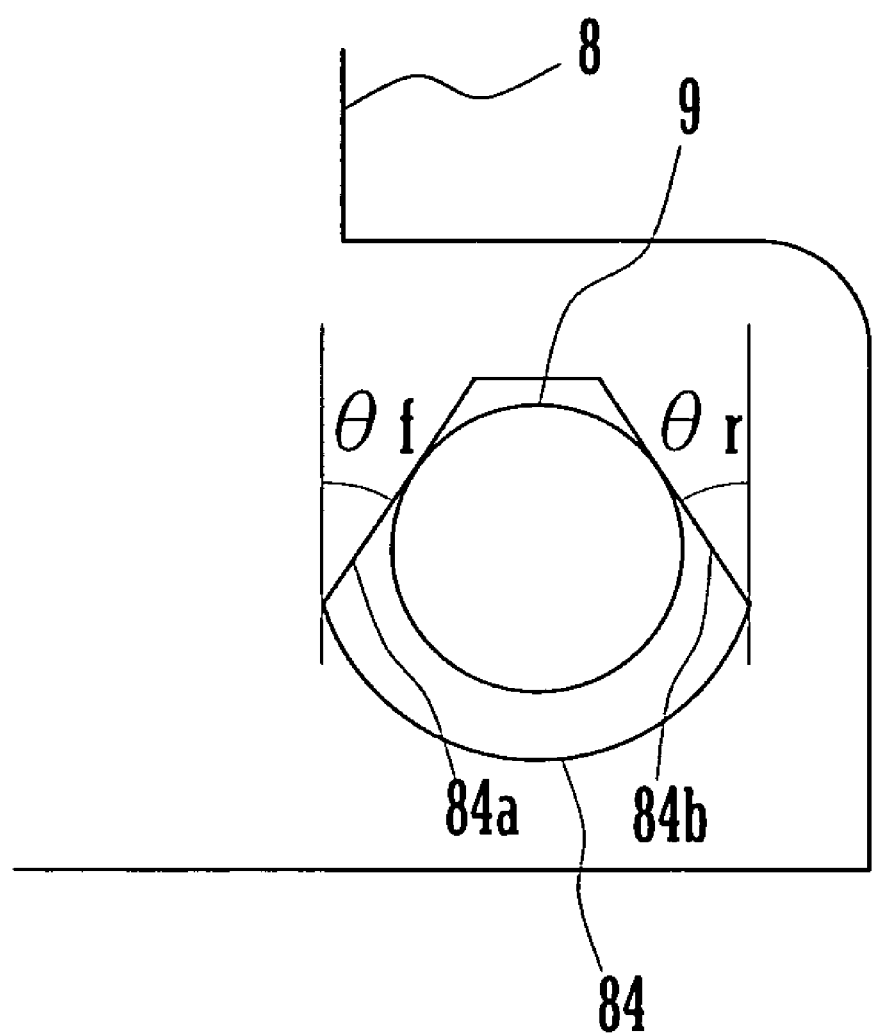
FIG. 4 is a side view that shows details of a shaft bearing provided in the aforementioned carriage.

FIG. 4 is a side view that shows details of the shaft bearing provided in the aforementioned carriage. A part of the inside circumferential face of the shaft bearing 84 is configured from a front side inclined face 84a and a rear side inclined face 84b. The shaft bearing 84 makes contact with the inclined faces 84a and 84b. Accordingly, it is not necessary to strictly control the inner diameter of the shaft bearing 84 considering the fit with the guide shaft 9.

Also, in order to support both sides of the circumferential face of the guide shaft 9 with the two inclined faces 84a and 84b, the angles θf and θr which the two respective inclined faces 84a and 84b form with the perpendicular direction necessarily are $$0<(\theta f+\theta r)<\pi$$

and necessarily satisfy the relationship $$\cos\{\pi/2-(\theta f+\theta r)\}>0.$$

In this manner, by setting the angles such that the cosine of an angle obtained by subtracting the sum of the angles which the two respective inclined faces 84a and 84b of the shaft bearing 84 that are provided in two locations of the carriage 8 form with the perpendicular direction from π/2, when the direction in which the guide shaft 9 is pressed against has been made a positive value, because the load that acts on the guide shaft 9 from the one inclined face 84a definitely becomes a positive value, a component parallel to the other inclined face 84b obtained by multiplying a positive cosine value by this value also definitely becomes a positive value, this component becomes the direction that the guide shaft 9 bites into the inclined faces 84a and 84b of the shaft bearing 84, and it is possible to reliably prevent the carriage 8 from rising up from the guide shaft 9.

However, it is necessary to consider the moment that acts on the carriage 9 when determining the angles θf and θr. That is, a pitching moment that biases the front and rear ends in the movement direction upward or downward, a rolling moment around the guide shaft 9, and a yawing moment that biases the front and rear ends in the movement direction to the front face side or the rear face side, act on the carriage 9.

Following is an explanation of a calculation method for determining the angles which the inclined faces of the shaft bearing form with the perpendicular direction with reference to FIGS. 5 to 14.

Figure 5:
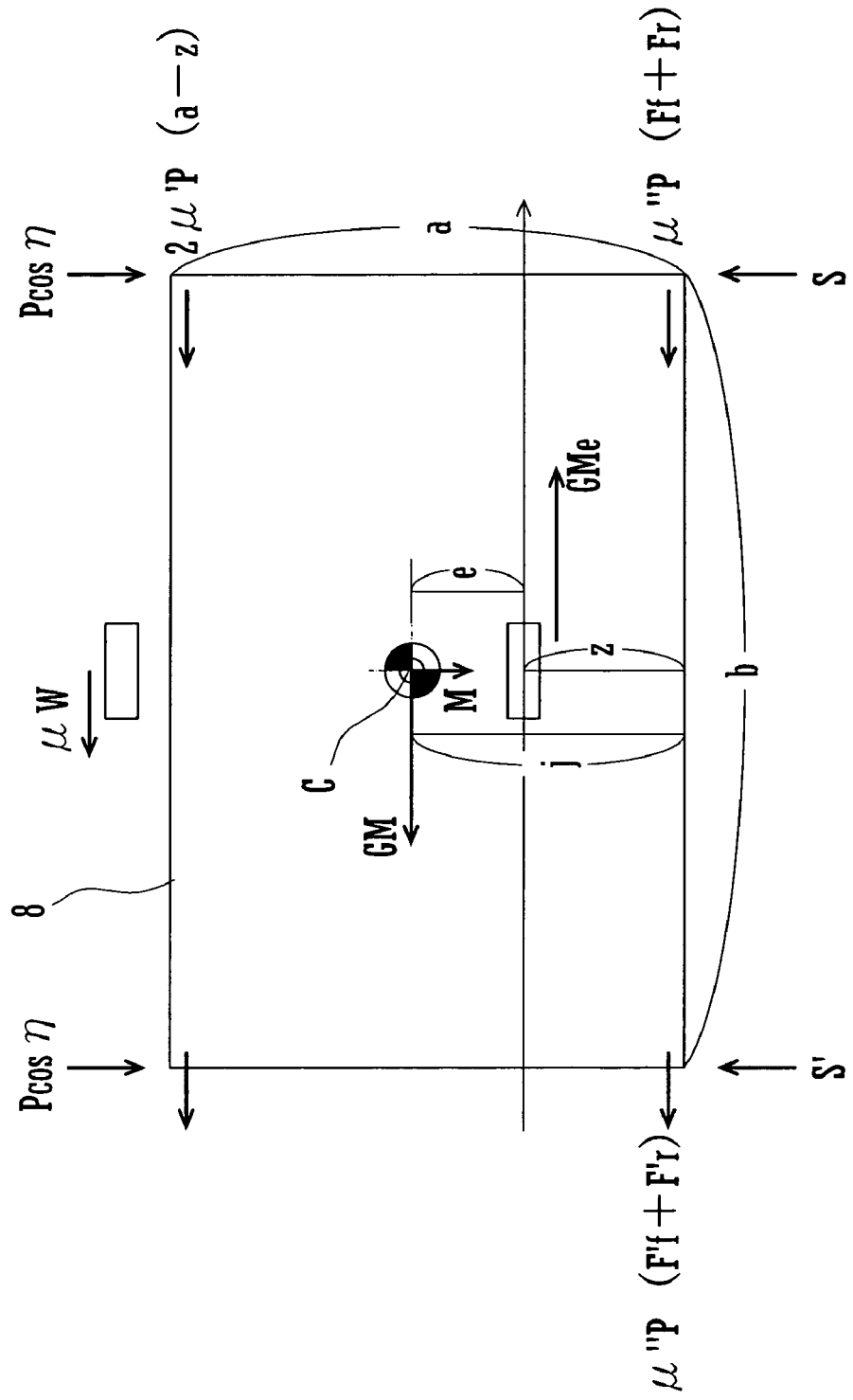
FIG. 5 is a front view that illustrates a calculation method for determining an angle that an inclined face of a shaft bearing forms with a perpendicular direction.

When the carriage 8 moves from the left side in FIG. 5 toward the right side, the mass of the carriage 8 is made M, the acceleration that acts on the carriage 8 when accelerating is made G, the load that acts on the rotation stopping member 81 is made W, the coefficient of friction between the rotation stopping member 81 and the first guide rail 31 is made µ, the pressing force of the pressing member 82 is made P, the coefficient of friction between the rotation stopping member 82 and the second guide rail 32 is made µ', the vertical load component that acts on the shaft bearing 84 on the downstream side (right side) in the movement direction is made S, the horizontal load component that acts on the shaft bearing 84 on the downstream side in the movement direction is made h, the vertical load component that acts on a shaft bearing 84' on the upstream side (left side) in the movement direction is made S', the horizontal load component that acts on the shaft bearing 84' of the upstream side of the movement direction is made h', the coefficient of friction between the shaft bearings 84 and 84' and the guide shaft 9 is made µ", the angle formed with the perpendicular direction of the pressing force P that acts from the pressing member 82 on the second guide rail 32 is made η, in the perpendicular direction, the distance from the contact position of the guide shaft 9 and the shaft bearings 84 and 84' to the point where movement force acts in the carriage 8 (the position where the driving belt 33 is fixed in the belt receiver 83) is made z, the distance to the contact position of the first guide rail 31 and the rotation stopping member 81 is made c, the distance to the center of gravity of the carriage 8 is made j, the distance to the contact position of the second guide rail 32 and the pressing member 82 is made a, in the horizontal direction perpendicular to the movement direction of the carriage 8, the distance from the contact position of the guide shaft 9 and the shaft bearings 84 and 84' to the center of gravity of the carriage 8 is made y, the distance to the contact position of the first guide rail 31 and the rotation stopping member 81 is made d, the distance to the contact position of the second guide rail 32 and the pressing member 82 is made k, and in the movement direction of the carriage 8, the spacing of the two shaft bearings 84 and 84' is made b.

As shown in FIG. 5, the pitching moment in this case is obtained from $$M + 2 \cdot P \cdot \cos \eta = S + S'.$$

Figure 6:
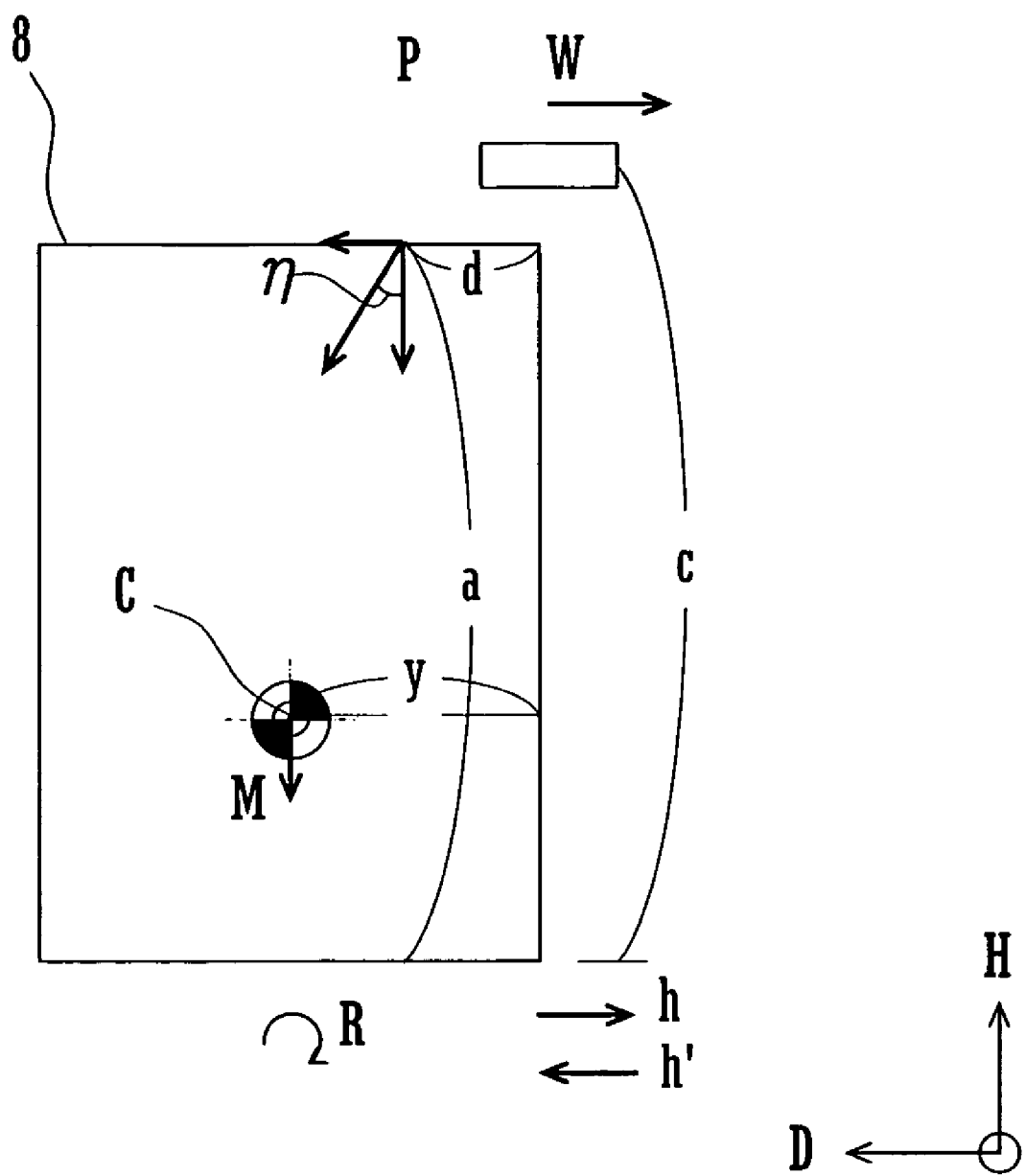
FIG. 6 is a side view that illustrates the same calculation method.

As shown in FIG. 6, the rolling moment is obtained from $$W \cdot c = M \cdot y + P \cdot \cos \eta \cdot d + P \cdot \sin \eta \cdot a.$$

Accordingly, the load W that acts on the rotation stopping member 81 is $$\therefore W = (M \cdot y + P \cdot \cos \eta \cdot d + P \cdot \sin \eta \cdot a)/c.$$

Figure 7:
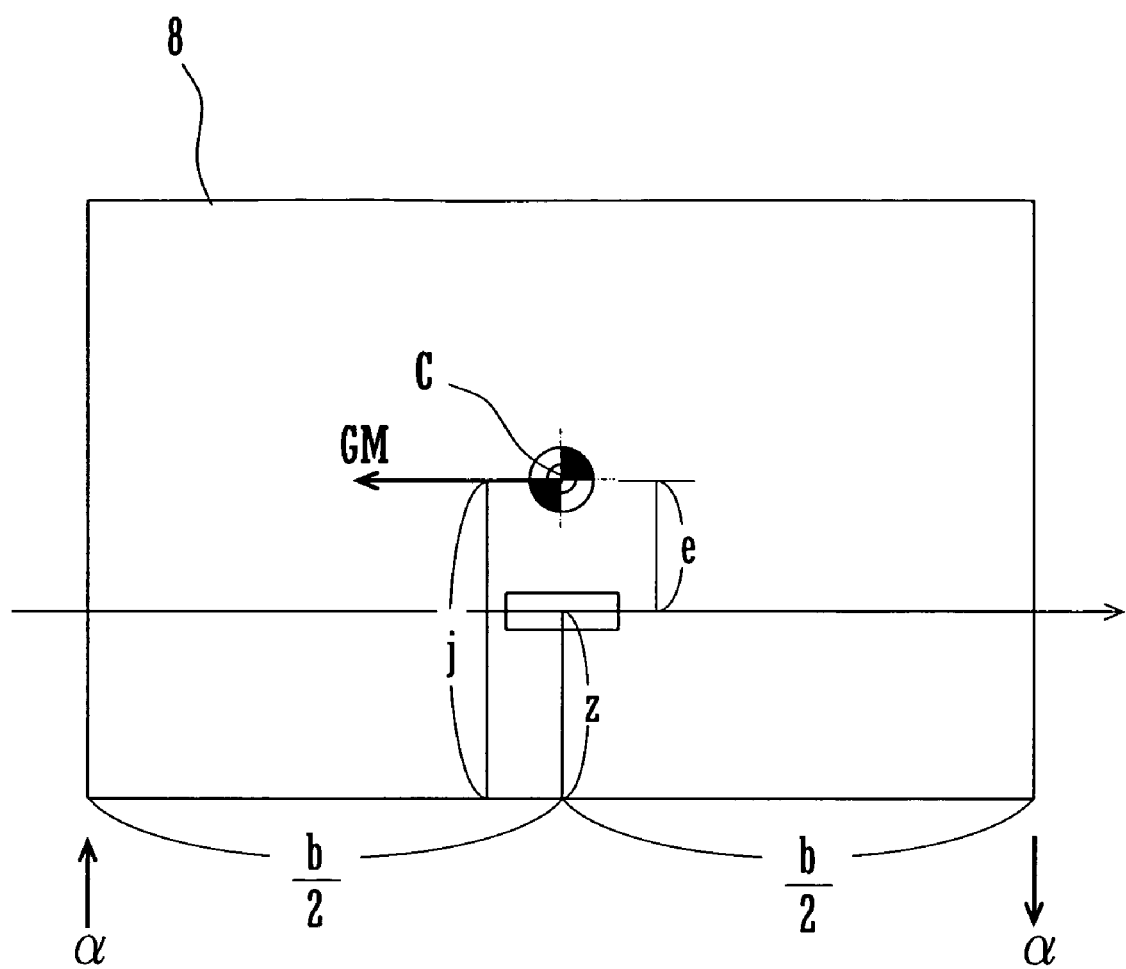
FIG. 7 is a front view that illustrates the same calculation method.

Here, as shown in FIG. 7, the inertial force α that acts on the carriage 8 is $$2 \cdot \alpha \cdot (b/2) = G \cdot M \cdot e$$

$$\therefore \alpha = G \cdot M \cdot (j-z)/b.$$

Figure 8:
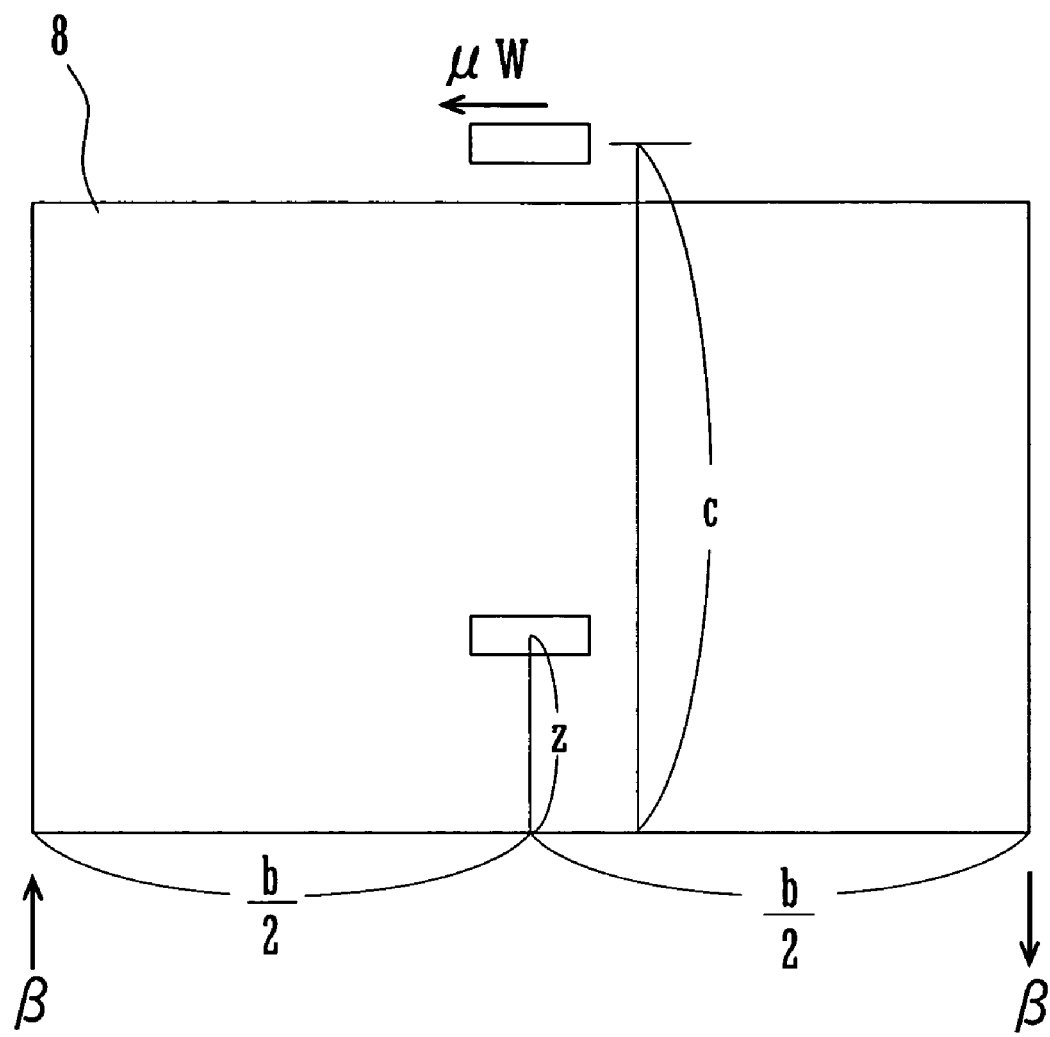
FIG. 8 is a front view that illustrates the same calculation method.

As shown in FIG. 8, the sliding resistance β of the rotation stopping member 81 is $$2 \cdot \beta \cdot (b/2) = \mu \cdot W \cdot (c-z)$$

$$\therefore \beta = \mu \cdot W \cdot (c-z)/b.$$

Figure 9:
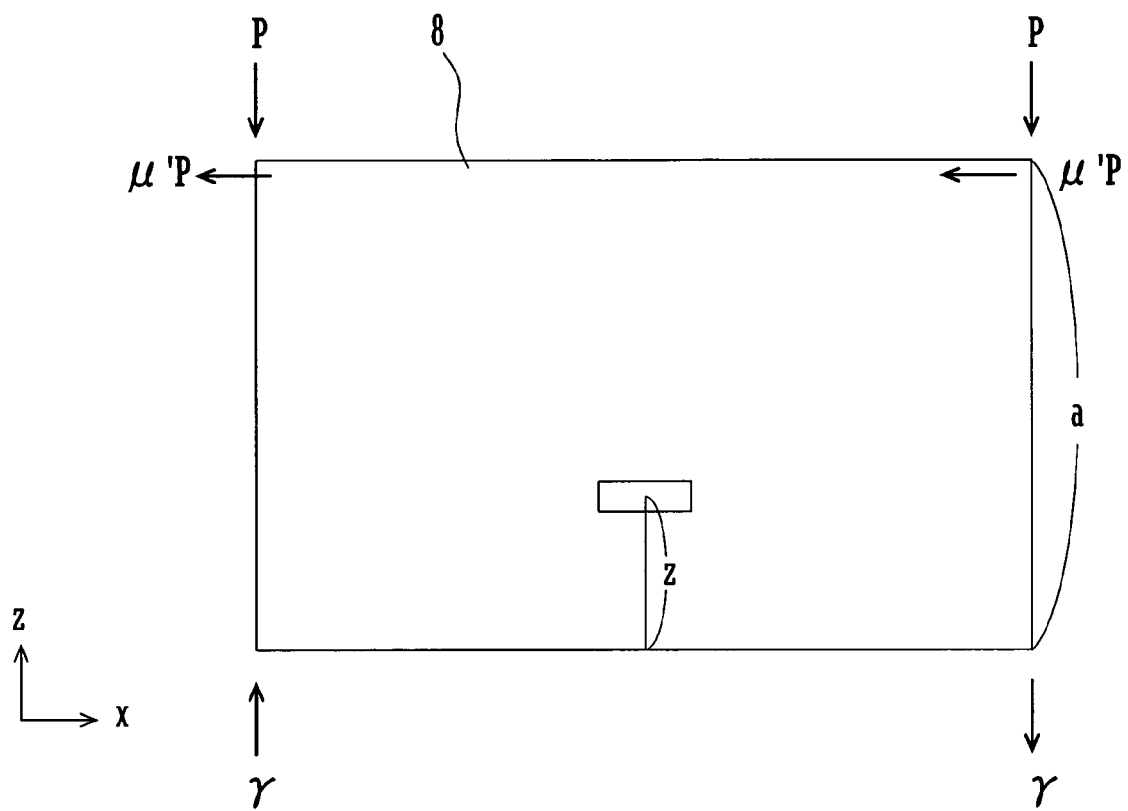
FIG. 9 is a front view that illustrates the same calculation method.

Further, as shown in FIG. 9, the sliding resistance γ of the pressing member 82 is $$2 \cdot \gamma \cdot (b/2) = 2 \cdot \mu' \cdot P \cdot (a-z)$$

$$\therefore \gamma = 2 \cdot \mu' \cdot P \cdot (a-z)/b.$$

Figure 10:
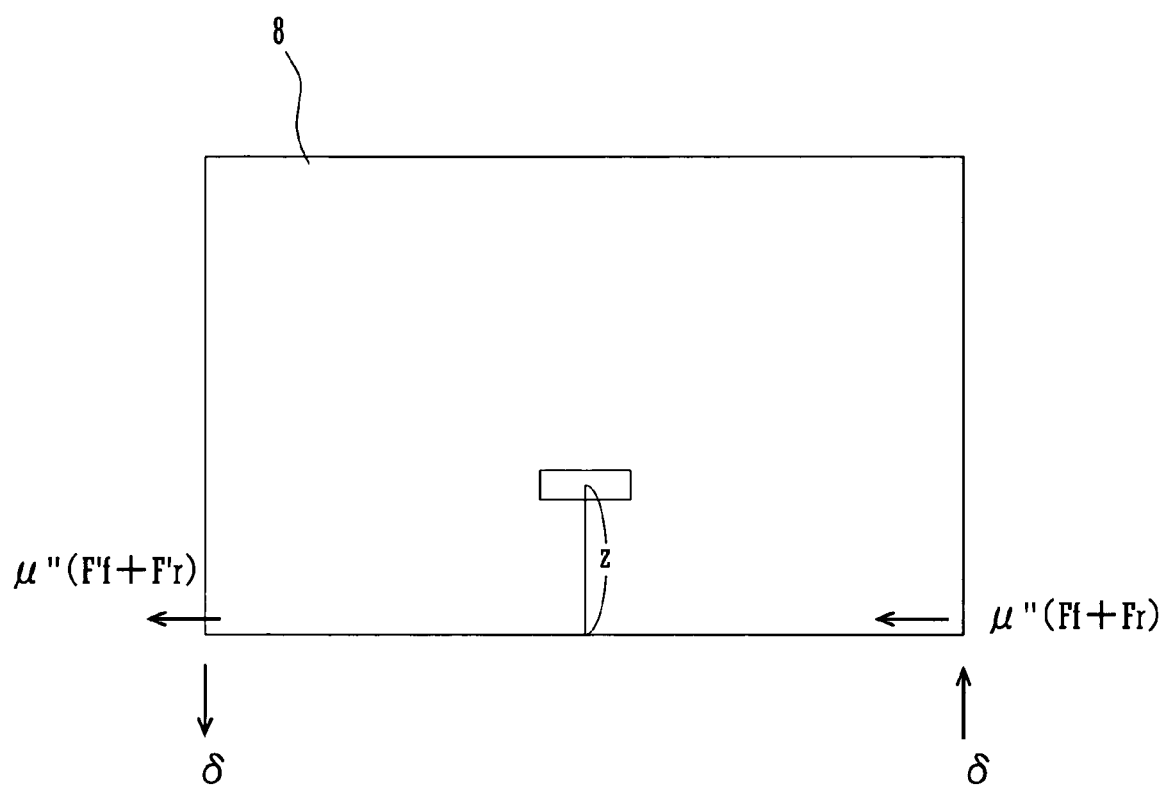
FIG. 10 is a front view that illustrates the same calculation method.
Figure 11:
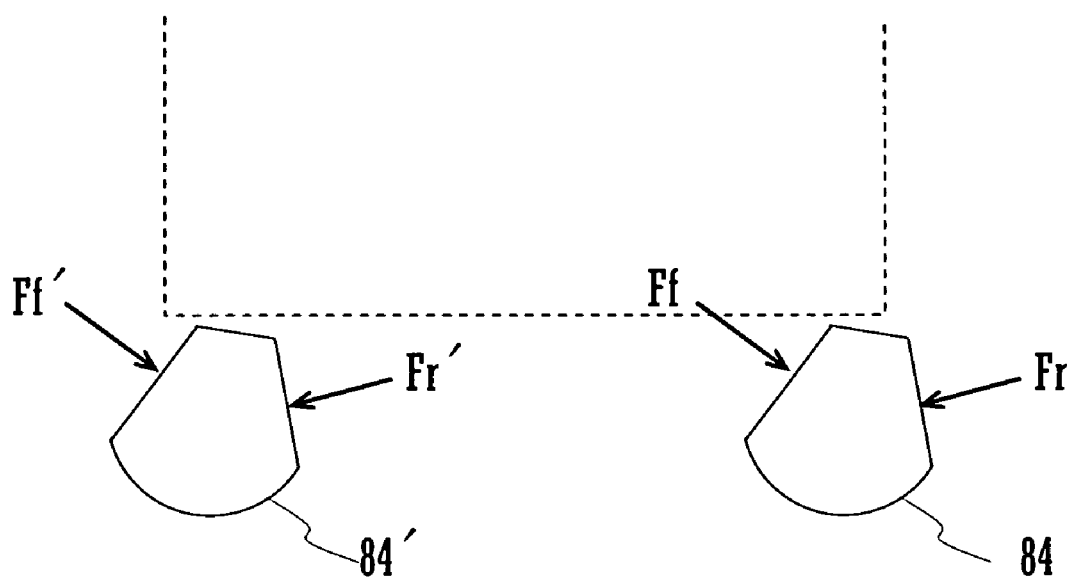
FIG. 11 is a side view of a shaft bearing that illustrates the same calculation method.

In addition, as shown in FIGS. 10 and 11, making the loads that respectively act on the inclined face 84a on the side of the position of the center of gravity (front face side) of the shaft bearing 84 on the downstream side in the movement direction of the carriage 8 and the inclined face 84b on the side opposite to the center of gravity (rear face side) to be Ff and Fr, and making the loads that respectively act on the front inclined face 84a' and the rear inclined face 84b' of the shaft bearing 84' on the upstream side in the movement direction of the carriage 8 to be Ff' and Fr', the sliding resistance δ of the guide shaft 9 is $$2 \cdot \delta \cdot (b/2) = \mu'' \cdot (Ff + Fr' + Ff' + Fr) \cdot z$$

$$\therefore \delta = \mu'' \cdot (Ff + Fr' + Ff' + Fr) \cdot z/b.$$

Accordingly, the vertical loads S and S' of the shaft bearings 84 and 84' are $$S = (M/2) + P \cdot \cos \eta - \alpha - \beta - \gamma + \delta$$

$$S' = (M/2) + P \cdot \cos \eta + \alpha + \beta + \gamma - \delta.$$

Figure 12:
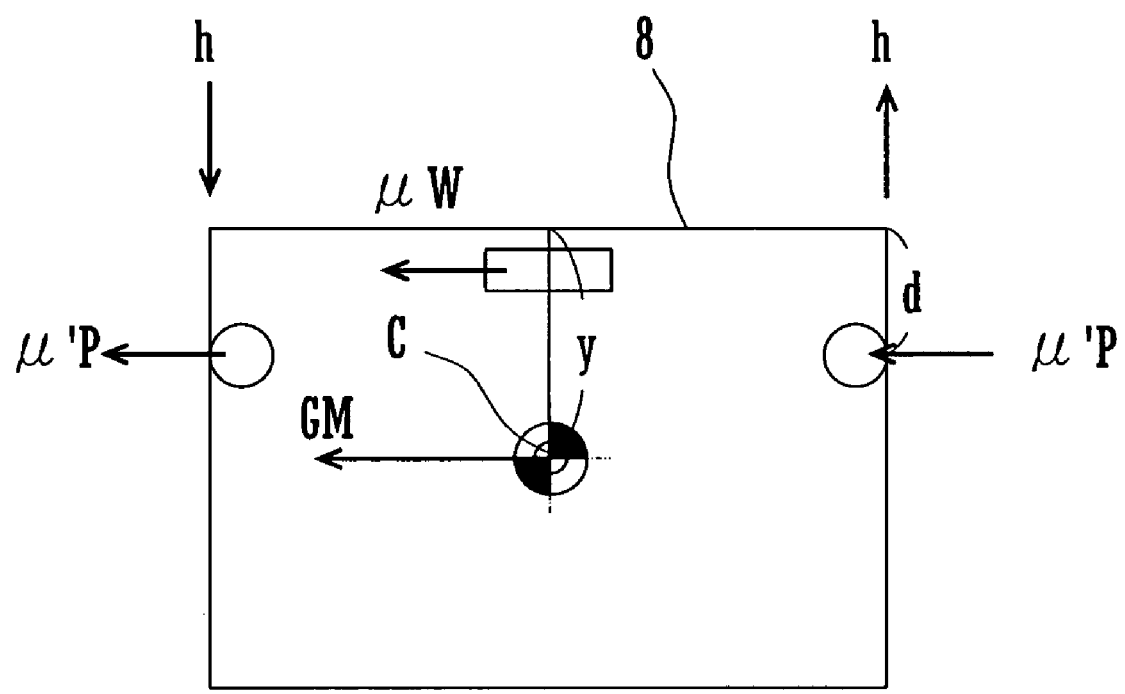
FIG. 12 is a plan view that illustrates the same calculation method.

On the other hand, as shown in FIG. 12, the yawing moment of the carriage 8 is obtained from $$2 \cdot h \cdot (b/2) = G \cdot M \cdot y + 2 \cdot \mu'' \cdot P \cdot d + \mu \cdot W \cdot k$$

and the horizontal load component h that acts on the shaft bearings 84 and 84' is $$h = G \cdot M \cdot y/b + 2 \cdot \mu'' \cdot P \cdot d/b + \mu \cdot W \cdot k/b.$$

Figure 14:
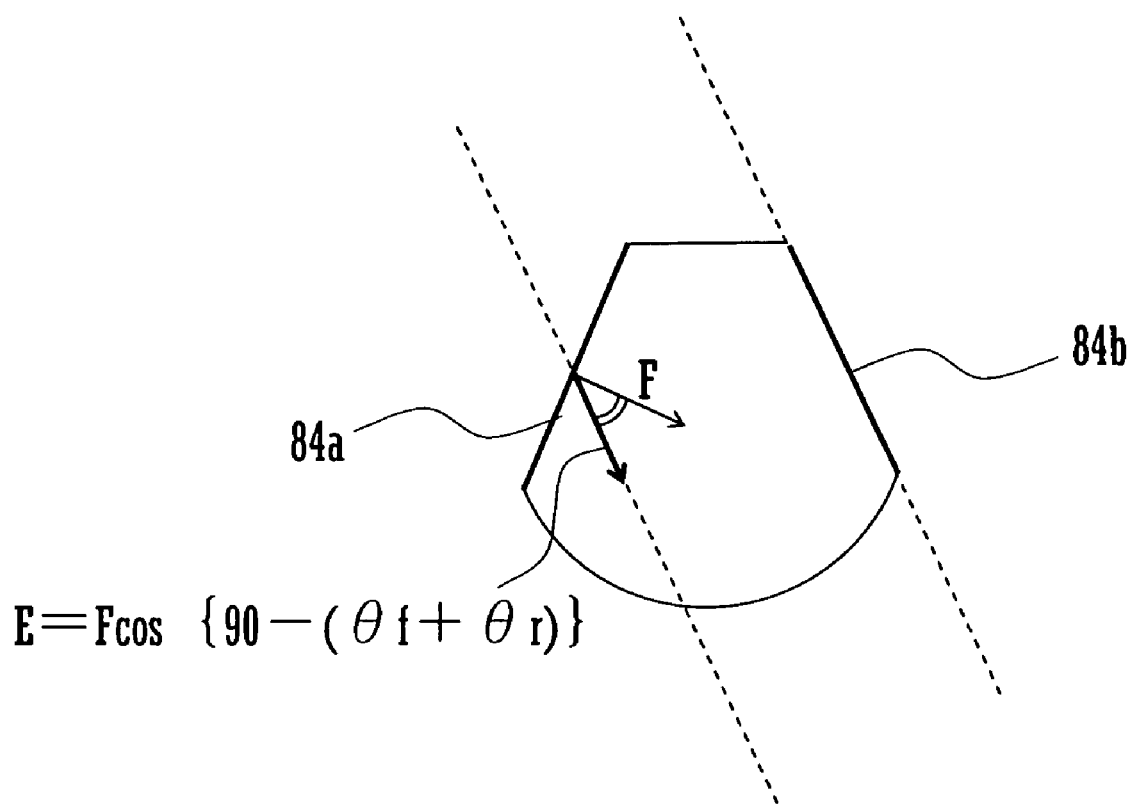
FIG. 14 is a side view of a shaft bearing that illustrates the same calculation method.

From the above, as shown in FIGS. 13 and 14, the vertical load component S and the horizontal load component h that act on the shaft bearing 84 on the downstream side in the movement direction, and the vertical load component S' and the horizontal load component h that act on the shaft bearing 84' on the upstream side in the movement direction, becomes $$S' = Ff' \cdot \sin \theta f + Fr' \cdot \sin \theta r \qquad \text{Formula 1}$$

$$h = Ff \cdot \cos \theta f - Fr' \cdot \cos \theta r \qquad \text{Formula 2}$$

$$S = Ff \sin \theta f + Fr \cdot \sin \theta r \qquad \text{Formula 3}$$

$$h = -Ff \cos \theta f + Fr \cos \theta r \qquad \text{Formula 4}$$

Here, when making $$(M/2) + P \cdot \cos \eta = \phi \text{ and}$$

$$(\alpha + \beta + \gamma) = \epsilon,$$

from formula 3, $$\phi - \epsilon + \mu''(Ff + Fr' + Ff' + Fr) \cdot z/b = Ff \sin \theta f + Fr \sin \theta r \qquad \text{Formula 3'}$$

and from formula 1, $$\phi + \epsilon - \mu''(Ff + Fr' + Ff' + Fr) \cdot z/b = Ff' \cdot \sin \theta f + Fr' \cdot \sin \theta r \qquad \text{Formula 1'}$$

Also, from (formula 2)−(formula 4), $$Ff = (Fr' + Fr) \cdot \cos \theta r / \cos \theta f - Ff,$$

from formula 2, $$Ff' = Fr' \cdot \cos \theta r / \cos \theta f + h/\cos \theta f,$$

and from formula 4, $$Ff = Fr \cdot \cos\theta r / \cos\theta f + h / \cos\theta f.$$

Substituting these into formula 3' and arranging gives:

$$Fr'\{(1+\cos\theta r)/\cos\theta f\}\cdot\mu''\cdot z/b + Fr\{(\cos\theta f + \cos\theta r)/\cos\theta f\}\cdot\mu''\cdot z/b - Fr\cdot\sin(\theta f + \theta r)/\cos\theta f = -h\cdot\tan\theta f - \phi + \varepsilon.$$

Further, extracting the second and third expressions on the left side gives:

$$Fr \cdot (1/\cos\theta f)\cdot\{(\cos\theta f+\cos\theta r)\cdot\mu''\cdot z/b - \sin(\theta f+\theta r)\} \quad \text{Formula 5}$$

and arranging Fr' gives:

$$Fr' = -Fr\cdot\{b/(\mu''\cdot z)/(\cos\theta r + \cos\theta f)\}\cdot\varepsilon - h\cdot b\cdot\sin\theta f/\{\mu''\cdot z(\cos\theta f + \cos\theta r)\} - \phi\cdot b\cdot\cos\theta f/\{\mu''\cdot z(\cos\theta f + \cos\theta r)\} + \varepsilon\cdot b\cdot\cos\theta f/\{\mu''\cdot z(\cos\theta f + \cos\theta r)\}.$$

Here, the first expression on the right side becomes $$-Fr\cdot\{1-b\cdot\sin(\theta f+\theta r)/(\mu''\cdot z)/(\cos\theta r + \cos\theta f)\} \quad \text{Formula 6}$$

Also, from formula 1' and formula 5, $$Fr'\{(\mu''\cdot z)/b\}\cdot(\cos\theta r+\cos\theta f)/\cos\theta f + \sin(\theta f+\theta r)/\cos(\theta r)\} + Fr(\mu''\cdot z/b)(\cos\theta r+\cos\theta f)/\cos\theta f = \phi+\varepsilon - h\cdot\tan\theta f \quad \text{Formula 7}$$

and from this formula 7, $$Fr=(\phi-\varepsilon+h\cdot\tan\theta f)\cdot\cos\theta f/\sin(\theta f+\theta r)+2\phi(\mu''\cdot z/b)(\cos\theta r+\cos\theta f)\cdot\cos\theta f/\sin 2(\theta f+\theta r), \quad \text{Formula 8}$$

and substituting this formula 8 in formula 4 and solving conditions Ff≧0 gives $$Ff=(\phi-\varepsilon-h\cdot\tan\theta r)\cdot\cos\theta r/\sin(\theta f+\theta r)+2\phi(\mu''\cdot z/b)(\cos\theta r+\cos\theta f)\cdot\cos\theta r/\sin 2(\theta f+\theta r) \quad \text{Formula 9}$$

On the other hand, substituting formula 8 in formula 6 and solving conditions Fr'≧0 gives $$Fr'=(-h\cdot\tan\theta f+\phi+\varepsilon)\cdot\cos\theta f/\sin(\theta f+\theta r)-2\phi(\mu''\cdot z/b)(\cos\theta r+\cos\theta f)\cdot\cos\theta f/\sin 2(\theta f+\theta r). \quad \text{Formula 10}$$

Further, substituting formula 10 in formula 2 gives $$Ff'=(\phi+\varepsilon+h\cdot\tan\theta r)\cdot\cos\theta r/\sin(\theta f+\theta r)-2\phi(\mu''\cdot z/b)(\cos\theta r+\cos\theta f)\cdot\cos\theta r/\sin 2(\theta f+\theta r) \quad \text{Formula 11}$$

FIG. 15 shows data values of an embodiment of this invention in which the angles θf and θr that form a perpendicular direction of the inclined faces 84a and 84b of the shaft bearing 84 have been calculated from the above calculation.

By calculating in the above manner, angles formed with the perpendicular direction of the two respective inclined faces 84a, 84b, 84a' and 84b' of the shaft bearings 84 and 84' are determined, taking into consideration all of the factors that affect the load that acts on the guide shaft 9 from the two respective inclined faces 84a, 84b, 84a' and 84b' of the shaft bearings 84 and 84'. Accordingly, the inclined faces 84a, 84b, 84a' and 84b' of the shaft bearings 84 and 84' do not separate from the guide shaft 9 when the carriage 8 accelerates or decelerates, and it is possible to reliably prevent the carriage 8 from rising up.

Making the maximum value of the moment that acts on the carriage 8 during movement due to disturbance to be Mm(gf·mm), the loads Ff, Fr, Ff' and Fr' that act on the guide shaft 9 from the two respective inclined faces 84a, 84b, 84a' and 84b' of the shaft bearings 84 and 84' can be made $$Ff\cdot\cos\{\pi/2-(\theta f+\theta r)\}\cdot b/2 > Mm$$

$$Fr\cdot\cos\{\pi/2-(\theta f+\theta r)\}\cdot b/2 > Mm$$

$$Ff\cdot\cos\{\pi/2-(\theta f+\theta r)\}\cdot b/2 > Mm$$

$$Ff\cdot\cos\{\pi/2-(\theta f+\theta r)\}\cdot b/2 > Mm$$

Thus, it is possible to set the angles θf, θr, θf', and θr' such that the components in the direction parallel to the face that opposes the load that acts on the guide shat 9 from the inclined faces 84a, 84b, 84a' and 84b' of the shaft bearings 84 and 84' are larger than the maximum value of the moment that acts on the carriage 8 during movement due to disturbance. Accordingly, even when disturbance such as vibration acts on the inkjet printer 1, the inclined faces 84a, 84b, 84a' and 84b' of the shaft bearings 84 and 84' do not separate from the guide shaft 9, and it is possible to reliably prevent the carriage 8 from rising up.

Figure 16:
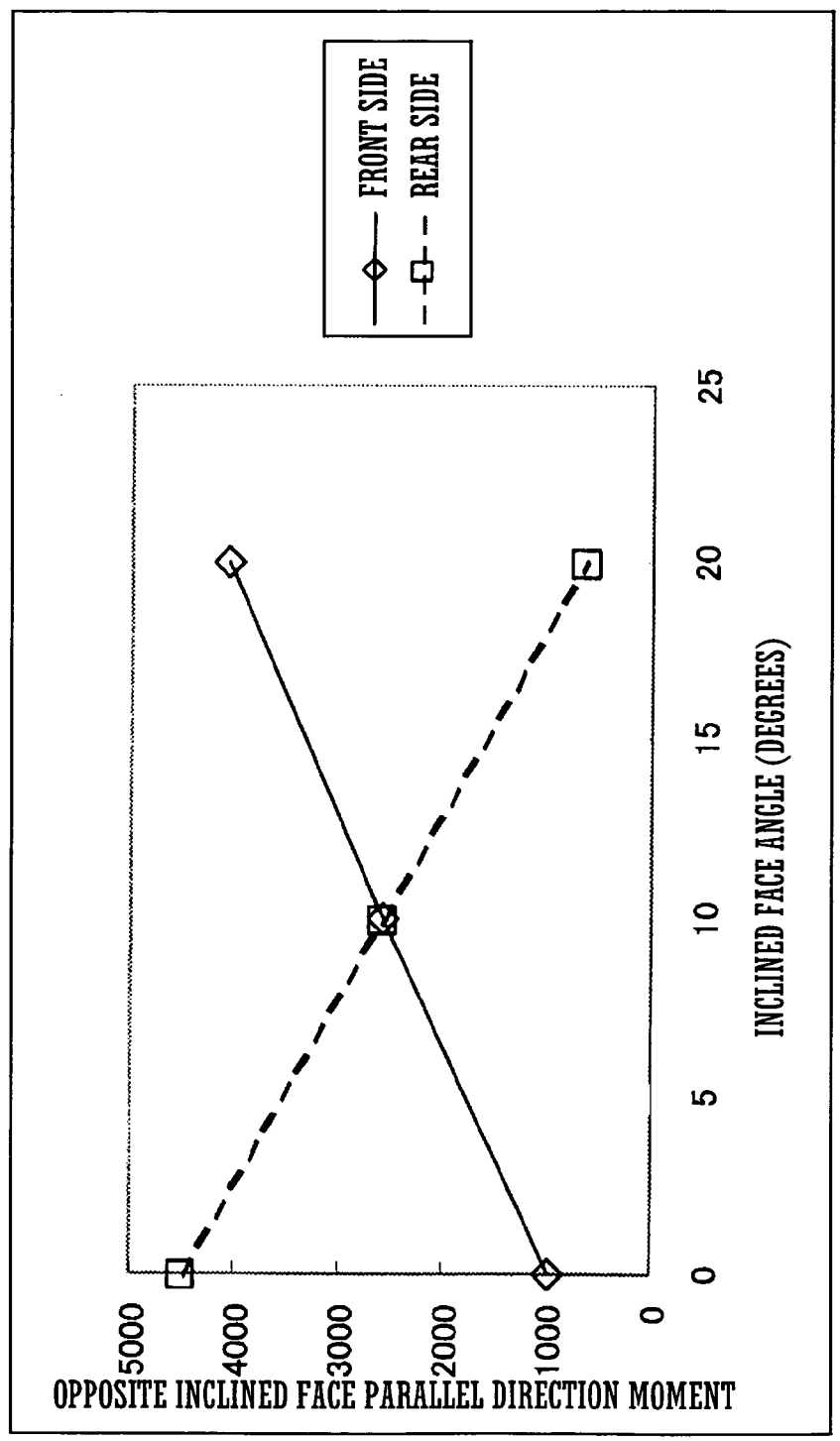
FIG. 16 shows the relationship between the angle of one inclined face in the shaft bearing and the moment of a direction parallel to the other inclined face.

Also, based on the relationship between the angle of one inclined face and the moment of the direction parallel to the other inclined face shown in FIG. 16, it is possible to make the load Ff (gf) that acts on the guide shaft 9 from the front side inclined face 84a in the shaft bearing 84 on the downstream side in the movement direction and the load Fr' (gf) that acts on the guide shaft 9 from the rear side inclined face 84b' in the shaft bearing 84' on the upstream side in the movement direction, and the load Ff' (gf) that acts on the guide shaft 9 from the rear side inclined face 84b in the shaft bearing 84 on the downstream side in the movement direction and the load Fr (gf) that acts on the guide shaft 9 from the front side inclined face 84a' in the shaft bearing 84' on the upstream side in the movement direction, approximately equal.

Thus, an approximately equal moment is generated at the inclined faces 84a, 84b, 84a' and 84b' of the shaft bearings 84 and 84' when the carriage 8 accelerates or decelerates, and it is possible to stably move the carriage 8.

Further, it is possible to determine the angles θf and θr which the two inclined faces of the shaft bearings 84 and 84' respectively form with the perpendicular direction such that $$abs[\Delta(\mu\cdot W + 2\cdot\mu'\cdot P + \mu''\cdot T)/\Delta\{57.3\cdot(\theta f+\theta r)\}] \leq 2$$

(where 57.3 (=180/π) is a coefficient for converting from rad to deg) is satisfied.

Figure 17:
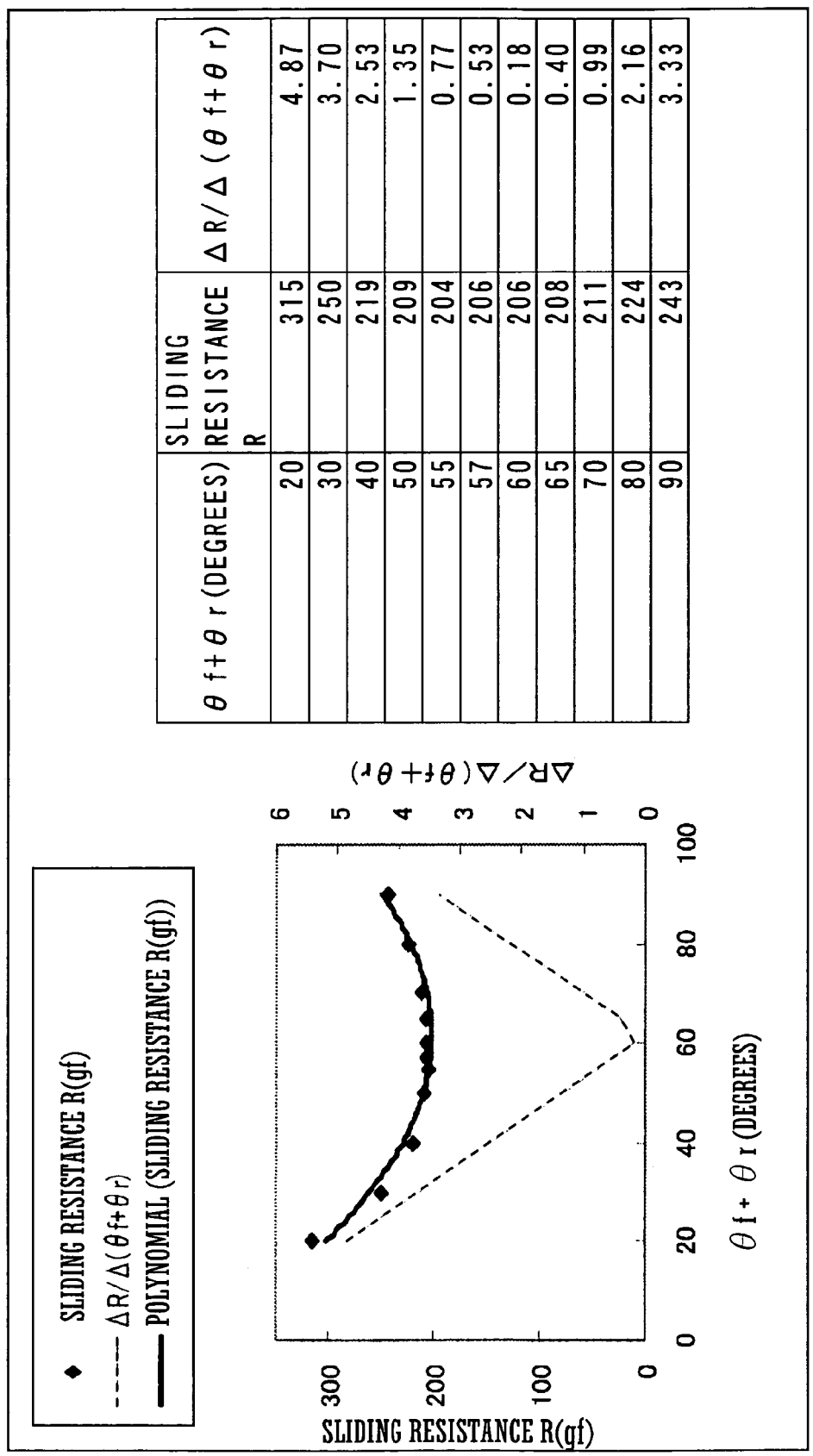
FIG. 17 shows the relationship between the sum of the angles of the two inclined faces in the shaft bearing and sliding resistance.

Thus, as shown in FIG. 17, because the value of sliding resistance becomes an approximately minimum value in a range where the ratio of the change in sliding resistance to the sum of the angles which the two inclined faces in the shaft bearing 84 form with the perpendicular direction is not more than two, the sliding resistance that occurs between the shaft bearing 84 and the guide shaft 9 when the carriage 8 moves can be suppressed to a low value, and it is possible to smoothly move the carriage 8.

In addition, as shown in FIG. 18A, in the shaft bearings 84 and 84' disposed at two locations in the movement direction of the carriage 8, it is possible to allow the angles θf and θr which the two inclined faces respectively form with the perpendicular direction to differ from each other. In the example shown in FIG. 18, the angle θr which the inclined face 84b of the rear side of one shaft bearing 84 (FIG. 8B) forms with the perpendicular direction is made a positive value, and the angle θr' which the inclined face 84b' of the rear side of the other shaft bearing 84' (FIG. 8C) forms with the perpendicular direction is made a negative value.

Thus, it is possible to move the carriage 8 back and forth in a stable state even when the movement speed of the carriage 8 differs when moving forth and when moving back.

FIG. 19 shows data for an embodiment of a carriage in which the angles of the inclined faces in the left and right shaft bearings 84 and 84' shown in FIG. 18 are different, and in which the pressing member 82 has been omitted. In this embodiment, the load from the pressing member 82 is made 0, and the angles of the inclined faces 84a, 84b, 84a' and 84b' of the shaft bearings 84 and 84' are calculated according to the method described above.

In the example shown in FIG. 19, when the acceleration is 2 G, the angle of the front side inclined face 84a in the shaft bearing 84 on the downstream side in the movement direction is 29°, and the angle of the rear side inclined face 84b' in the shaft bearing 84' on the upstream side in the movement direction is −8°. Also, when the acceleration is 0.8 G, the angle of the front side inclined face 84a in the shaft bearing 84 on the downstream side in the movement direction is 41°, and the angle of the rear side inclined face 84b' in the shaft bearing 84' on the upstream side in the movement direction is 7°.

Accordingly, when the carriage 8 moves right at 2 G of acceleration and moves left at 0.8 G of acceleration, the angle of the front side inclined face 84a of the right side shaft bearing 84 is made 29° and the angle of the rear side inclined face 84b is made 7°, and the angle of the front side inclined face 84a' of the left side shaft bearing 84' is made 41° and the angle of the rear side inclined face 84b' is made −8°.

Also, in the above description, an inkjet printer provided with a carriage that is a movable member was given as an example of the image device of this invention, but this invention may also be similarly embodied with respect to other image devices, such as an image reading device.

The invention claimed is:

1. An image device comprising:
a guide shaft that includes an arc portion in at least part of a cross-section;
a movable member that moves back and forth inside the device along the guide shaft when reading or recording image information;
a shaft bearing penetrated by the guide shaft at two locations in a movement direction that differ from a center of gravity in the movable member, the shaft bearing including two inclined faces contacted by the arc portion of the guide shaft in the cross-section;
a first guide rail disposed parallel to the guide shaft;
a second guide rail disposed parallel to the guide shaft;
a rotation stopping member provided in the movable member, the rotation stopping member sliding in the direction of rotation of the movable member with the guide shaft as a center and in contact with the first guide rail; and
a pressing member provided in the movable member, the pressing member sliding while pressing against the second guide rail,
wherein the respective two inclined faces of the shaft bearing are at an angle θf (rad) and an angle θr (rad) with a perpendicular direction, the angle θf (rad) and the angle θr (rad) satisfying the following inequality:

cos {π/2−(θf+θr)}>0, and
wherein the angle θf (rad) and the angle θr (rad) are determined such that a load Ff (gf) received by the inclined face of a side of the center of gravity of the movable member in the shaft bearing on a downstream side in the movement direction and a load Fr' (gf) received by the inclined face opposite to the side of the center of gravity of the movable member in the shaft bearing on an upstream side in the movement direction become positive values when calculated when a mass of the movable member is made M, an acceleration that acts on the movable member when accelerating is made G, a load that acts on the first guide rail from the rotation stopping member is made W, a coefficient of friction between the rotation stopping member and the first guide rail is made μ, a pressing force that acts on the second guide rail from the pressing member is made P, a coefficient of friction between the pressing member and the second guide rail is made μ', a coefficient of friction between the shaft bearings and the guide shaft is made μ", an angle formed with the direction perpendicular to the pressing force that acts on the second guide rail from the pressing member is made η, in the perpendicular direction, a distance from a contact position of the guide shaft and the shaft bearings to a point where movement force acts in the movable member is made z, a distance to a contact position of the first guide rail and the rotation stopping member is made c, a distance to the center of gravity of the movable member is made j, a distance to a contact position of the second guide rail and the pressing member is made a, in the horizontal direction perpendicular to the movement direction of the movable member, a distance from the contact position of the guide shaft and the shaft bearing to the center of gravity of the movable member is made y, a distance to the contact position of the first guide rail and the rotation stopping member is made d, a distance to the contact position of the second guide rail and the pressing member is made k, in the movement direction of the movable member, a spacing of the two shaft bearings is made b, and $$Ff = \{\phi - \varepsilon - h \cdot \tan\theta r\} \cdot \cos\theta r / \sin(\theta f + \theta r) +$$
$$2\phi\{(\mu'' \cdot z)/b\}(\cos\theta r + \cos\theta f) \cdot \cos\theta r / \sin 2(\theta f + \theta r)$$
$$Fr' = \{\phi + \varepsilon - h \cdot \tan\theta f\} \cdot \cos\theta f / \sin(\theta f + \theta r) -$$
$$2\phi\{(\mu'' \cdot z)/b\}(\cos\theta r + \cos\theta f) \cdot \cos\theta f / \sin 2(\theta f + \theta r),$$
$$\text{where } \phi = (M/2) + P \cdot \cos\eta$$
$$\varepsilon = \{G \cdot M(j-z) + \mu \cdot W(c-z) + 2\mu' \cdot P(a-z)\}/b$$
$$h = \{G \cdot M \cdot y + 2\mu'' \cdot P \cdot d + \mu \cdot W \cdot k\}/b.$$

2. The image device according to claim 1, wherein a maximum value of moment that acts on the movable member when it moves due to disturbance is made Mm (gf·mm), and the load Ff (gf) received by the inclined face of the side of the center of gravity of the movable member in the shaft bearing on the downstream side in the movement direction and the load Fr' (gf) received by the inclined face opposite to the side of the center of gravity of the movable member in the shaft bearing on the upstream side in the movement direction are made $$Ff \cdot \cos\{\pi/2 - (\theta f + \theta r)\} \cdot b/2 > Mm$$
$$Fr' \cdot \cos\{\pi/2 - (\theta f + \theta r)\} \cdot b/2 > Mm.$$

3. The image device according to claim 1, wherein the load Ff (gf) received by the inclined face of the side of the center of gravity of the movable member in the shaft bearing on the downstream side in the movement direction and the load Fr'

(gf) received by the inclined face opposite to the side of the center of gravity of the movable member in the shaft bearing on the upstream side in the movement direction are made approximately equal.

4. The image device according to claim 1, wherein in the shaft bearings disposed in two locations in the movement direction of the movable member, the angle θf (rad) and the angle θr (rad) which the two respective inclined faces of the shaft bearing form with the perpendicular direction differ from each other.

5. An image device comprising:
a guide shaft that includes an arc portion in at least part of a cross-section;
a movable member that moves back and forth inside the device along the guide shaft when reading or recording image information;
a shaft bearing penetrated by the guide shaft at two locations in a movement direction that differ from a center of gravity in the movable member, the shaft bearing including two inclined faces contacted by the arc portion of the guide shaft in the cross-section;
a first guide rail disposed parallel to the guide shaft;
a second guide rail disposed parallel to the guide shaft;
a rotation stopping member provided in the movable member, the rotation stopping member sliding in the direction of rotation of the movable member with the guide shaft as a center and in contact with the first guide rail; and
a pressing member provided in the movable member, the pressing member sliding while pressing against the second guide rail,
wherein the respective two inclined faces of the shaft bearing are at an angle θf (rad) and an angle θr (rad) with a perpendicular direction, the angle θf (rad) and the angle θr (rad) satisfying the following inequality:

$\cos\{\pi/2(\theta f+\theta r)\}>0$, and
wherein the angle θf (rad) and the angle θr (rad) are determined such that a load Ff (gf) received by the inclined face opposite to a side of the center of gravity of the movable member in the shaft bearing on a downstream side in the movement direction and a load Fr (gf) received by the inclined face opposite to the side of the center of gravity of the movable member in the shaft bearing on upstream side in the movement direction become positive values when calculated when
a mass of the movable member is made M, an acceleration that acts on the movable member when accelerating is made G, a load that acts on the first guide rail from the rotation stopping member is made W, a coefficient of friction between the rotation stopping member and the first guide rail is made μ, a pressing force that acts on the second guide rail from the pressing member is made P, a coefficient of friction between the pressing member and the second guide rail is made μ', a coefficient of friction between the shaft bearings and the guide shaft is made μ", an angle formed with the direction perpendicular to the pressing force that acts on the second guide rail from the pressing member is made η,
in the perpendicular direction, a distance from a contact position of the guide shaft and the shaft bearings to a point where movement force acts in the movable member is made z, a distance to a contact position of the first guide rail and the rotation stopping member is made c, a distance to the center of gravity of the movable member is made j, a distance to a contact position of the second guide rail and the pressing member is made a,
in the horizontal direction perpendicular to the movement direction of the movable member, a distance from the contact position of the guide shaft and the shaft bearing to the center of gravity of the movable member is made y, a distance to the contact position of the first guide rail and the rotation stopping member is made d, a distance to the contact position of the second guide rail and the pressing member is made k,
in the movement direction of the movable member, a spacing of the two shaft bearings is made b, and $$Ff = \{\phi + \varepsilon + h \cdot \tan\theta r\} \cdot \cos\theta r / \sin(\theta f + \theta r) -$$
$$2\phi\{(\mu'' \cdot z)/b\}(\cos\theta r + \cos\theta f) \cdot \cos\theta r / \sin2(\theta f + \theta r)$$
$$Fr = \{\phi - \varepsilon + h \cdot \tan\theta r\} \cdot \cos\theta r / \sin(\theta f + \theta r) +$$
$$2\phi\{(\mu'' \cdot z)/b\}(\cos\theta r + \cos\theta f) \cdot \cos\theta r / \sin2(\theta f + \theta r),$$
$$\text{where } \phi = (M/2) + P \cdot \cos\eta$$
$$\varepsilon = \{G \cdot M(j-z) + \mu \cdot W(c-z) + 2\mu' \cdot P(a-z)\}/b$$
$$h = \{G \cdot M \cdot y + 2\mu'' \cdot P \cdot d + \mu \cdot W \cdot k\}/b.$$

6. The image device according to claim 5, wherein a maximum value of moment that acts on the movable member when it moves due to disturbance is made Mm (gf), and the load Ff (gf) received by the inclined face opposite to the side of the center of gravity of the movable member in the shaft bearing on the downstream side in the movement direction and the load Fr (gf) received by the inclined face of the side of the center of gravity of the movable member in the shaft bearing on the upstream side in the movement direction are made $$Ff \cdot \cos\{\pi/2 - (\theta f + \theta r)\} \cdot b/2 > Mm$$
$$Fr \cdot \cos\{\pi/2 - (\theta f + \theta r)\} \cdot b/2 > Mm.$$

7. The image device according to claim 5, wherein the load Ff (gf) received by the inclined face opposite to the side of the center of gravity of the movable member in the shaft bearing on the downstream side in the movement direction and the load Fr (gf) received by the inclined face of the side of the center of gravity of the movable member in the shaft bearing on the upstream side in the movement direction are made approximately equal.

8. The image device according to claim 1 or 5, wherein the angle θf (rad) and the angle θr (rad) which the two respective inclined faces of the shaft bearing form with the perpendicular direction are determined such that they satisfy $$\text{abs}[\Delta(\mu \cdot W + 2 \cdot \mu' \cdot P + \mu'' + T)/\Delta\{57.3 \cdot (\theta f + \theta r)\}] \leq 2.$$

* * * * *